(12) United States Patent
Umeda et al.

(10) Patent No.: US 10,707,712 B2
(45) Date of Patent: Jul. 7, 2020

(54) ROTATING ELECTRIC MACHINE

(71) Applicant: MITSUBISHI ELECTRIC CORPORATION, Chiyoda-ku (JP)

(72) Inventors: Takashi Umeda, Chiyoda-ku (JP); Hiroki Kitani, Chiyoda-ku (JP); Junka Okamoto, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/763,851

(22) PCT Filed: Nov. 27, 2015

(86) PCT No.: PCT/JP2015/083416
§ 371 (c)(1),
(2) Date: Mar. 28, 2018

(87) PCT Pub. No.: WO2017/090189
PCT Pub. Date: Jun. 1, 2017

(65) Prior Publication Data
US 2018/0287443 A1    Oct. 4, 2018

(51) Int. Cl.
*H02K 1/28*    (2006.01)
*H02K 21/24*   (2006.01)
(Continued)

(52) U.S. Cl.
CPC ............ *H02K 1/28* (2013.01); *H02K 1/278* (2013.01); *H02K 1/2786* (2013.01);
(Continued)

(58) Field of Classification Search
CPC ........... H02K 1/28; H02K 1/27; H02K 1/278; H02K 1/2786; H02K 21/227; H02K 21/24;
(Continued)

(56) References Cited

U.S. PATENT DOCUMENTS

| 9,960,644 | B2 * | 5/2018 | Hashimoto | ............ | H02K 1/148 |
| 2013/0106207 | A1 * | 5/2013 | Song | ...................... | H02K 1/278 |
| | | | | | 310/43 |

(Continued)

FOREIGN PATENT DOCUMENTS

CN    102349216 A    2/2012
CN    202405973 U    8/2012
(Continued)

OTHER PUBLICATIONS

JP-2005168128-A machine translation May 11, 2019.*
(Continued)

*Primary Examiner* — Tran N Nguyen
*Assistant Examiner* — Leda T Pham
(74) *Attorney, Agent, or Firm* — Xsensus LLP

(57) ABSTRACT

A rotor in a rotating electric machine including a rotor main body and at least one magnet unit provided at an outer circumferential part of the rotor main body. The magnet unit has a plurality of magnet teeth as segments in the circumferential direction. The plurality of magnet teeth that form one magnet unit are arranged in a circular arc shape. At least one pair of magnet teeth in one magnet unit is each provided with a notch. With the plurality of magnet teeth being arranged in the circular arc shape, a fixation block is press-fitted in the pair of notches. The fixation block is fastened to the rotor main body while being inserted in the notches.

25 Claims, 20 Drawing Sheets

(51) Int. Cl.
*H02K 21/14* (2006.01)
*H02K 1/30* (2006.01)
*H02K 21/22* (2006.01)
*H02K 1/27* (2006.01)
*H02K 1/16* (2006.01)

(52) U.S. Cl.
CPC ............. *H02K 1/2793* (2013.01); *H02K 1/30* (2013.01); *H02K 21/14* (2013.01); *H02K 21/227* (2013.01); *H02K 21/24* (2013.01); *H02K 1/165* (2013.01)

(58) Field of Classification Search
CPC ........ H02K 1/2793; H02K 1/30; H02K 21/14; H02K 1/274; H02K 15/03; H02K 1/276
See application file for complete search history.

(56) References Cited

U.S. PATENT DOCUMENTS

| | | | | |
|---|---|---|---|---|
| 2014/0239749 | A1* | 8/2014 | Fehn | ......................... H02K 1/04 310/43 |
| 2014/0361657 | A1* | 12/2014 | Vohlgemuth | ........... H02K 1/148 310/216.009 |
| 2015/0194850 | A1 | 7/2015 | Muniz Casais | |
| 2017/0077768 | A1 | 3/2017 | Hashimoto et al. | |
| 2017/0288517 | A1* | 10/2017 | Ikeno | ..................... H02K 21/16 |

FOREIGN PATENT DOCUMENTS

| | | | | |
|---|---|---|---|---|
| JP | 2005-168128 A | | 6/2005 | |
| JP | 2005168128 A | * | 6/2005 | ............. H02K 1/276 |
| JP | 2011-097742 A | | 5/2011 | |
| JP | 4771010 B1 | | 9/2011 | |
| JP | 5493710 B2 | | 5/2014 | |
| WO | 2011/012131 A2 | | 2/2011 | |
| WO | 2014/001512 | | 1/2014 | |
| WO | 2014/192076 A1 | | 12/2014 | |

OTHER PUBLICATIONS

International Search Report dated Mar. 1, 2016 in PCT/JP2015/083416, filed on Nov. 27, 2015.
Office Action issued in Chinese Application 201560084637.6 dated Jul. 1, 2019.
Chinese Office Action dated Dec. 12, 2019 in Chinese Application No. 201580084637.6.

* cited by examiner

ROTATING ELECTRIC MACHINE

TECHNICAL FIELD

The present invention relates to a rotating electric machine.

BACKGROUND ART

In general, a more compact and efficient rotating electric machine can be obtained by using magnets with stronger magnetic force. However, if the magnetic force of magnets is too strong, the magnets may swiftly be drawn to a rotor main body of a magnetic substance by attraction, hit thereupon, and crack during assembly of the magnets to a rotor. Operation postures become unstable because the magnets must be assembled on the outer circumference of the disk-shaped rotor. A magnet to be assembled will be immediately next to another magnet of an opposite polarity that has been previously assembled. Magnet assembling work must be carried out against the strong attraction force generated between the two magnets, which lowers the workability of assembling the rotor.

The rotating electric machine once assembled includes magnets and a stator disposed opposed to each other at a very small gap distance therebetween. More specifically, the core of the stator is always attracted by the magnetic force of the magnets. Therefore, when implementing the repair and maintenance of the rotating electric machine, the rotor and the stator must be disassembled and reassembled against the strong magnetic attraction force, which lowers the workability, prolongs the work period, and hence increases work costs. As the size of the rotating electric machine increases, the sizes of the rotor and the stator increase, and the number and size of the magnets increase. Therefore, the disadvantage associated with the assembling workability becomes more apparent.

In connection with the disadvantage, PTL 1 suggests a structure in which the outer circumferential part of the rotor is provided discretely as a rotor core, and magnets are assembled to the core and fastened to the rotor main body. In this way, the work of assembling the magnets can be carried out to a rotor core which is smaller than the rotor main body. Therefore, the assembling workability of the rotor can be improved. The rotor core can be removed from the rotor after the completion of the assembling, which facilitates repair works.

CITATION LIST

Patent Literature

[PTL 1] Japanese Patent No. 4771010 (Specification)

SUMMARY OF INVENTION

Technical Problem

However, in the disclosure of PTL 1, the discretely provided rotor core has a circular arc shape, and this results in a poor material yield. To address this, the rotor core may be manufactured by casting. However, in order to ensure a desired profile irregularities at the magnet assembling surface and the surface of assembly with the rotor main body and desired roundness for the rotor, cutting and polishing must be carried out after the casting. The circular arc shape of the rotor core necessitates the use of a jig for stabilizing the orientation of the rotor core during the magnet assembling work. The work of assembling magnets at the outer circumferential surface is the same as the case of a conventional rotor, and the work postures become unstable, which lowers the workability.

With the foregoing in view, it is an object of the present invention to provide a rotating electric machine having a rotor structure with high productivity and maintainability.

Solution to Problem

In order to achieve the above-described object, a rotating electric machine according to the present invention includes a rotor and a stator. The rotor includes a rotor main body and at least one magnet unit provided at an outer circumferential part of the rotor main body. The magnet unit has a plurality of magnet teeth as segments in a circumferential direction. The plurality of magnet teeth that form one of the magnet units are arranged in a circular arc shape. A magnet is attached to the magnet tooth. At least a pair of the magnet teeth in one of the magnet units is each provided with a notch. A fixation block is press-fitted in a pair of the notches, with the plurality of magnet teeth being arranged in the circular arc shape. The fixation block is fastened to the rotor main body, with the fixation block being inserted in the notches.

Advantageous Effects of Invention

According to the present invention, a rotating electric machine having a rotor structure with high productivity and maintainability can be provided.

DESCRIPTION OF EMBODIMENTS

Figure 1A:
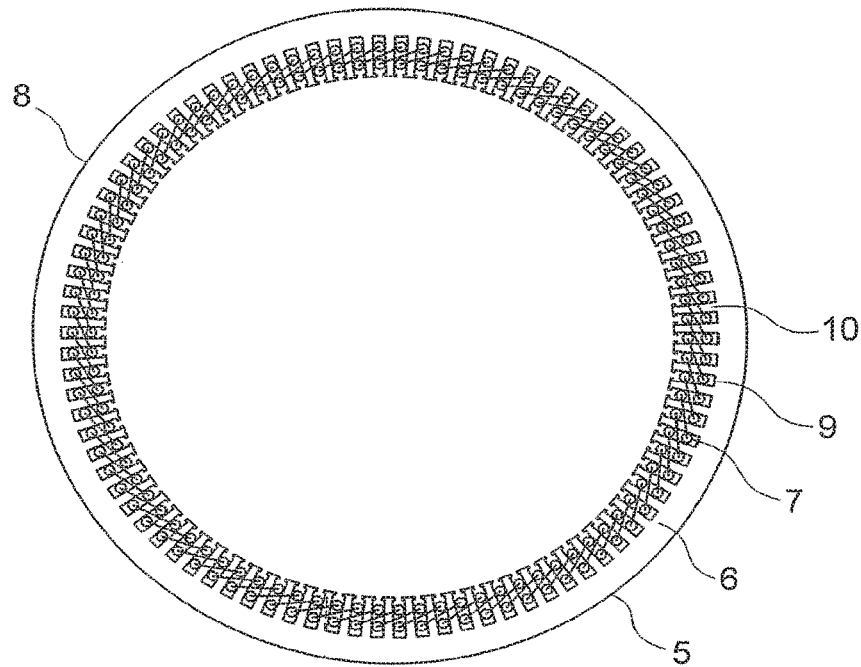
FIG. 1A is a plan view of a stator in a rotating electric machine according to a first embodiment of the present invention.

Now, embodiments of the present invention will be described in conjunction with the accompanying drawings. Note that in the drawings, the same reference characters designate the same or corresponding portions.

FIRST EMBODIMENT

Figure 1B:
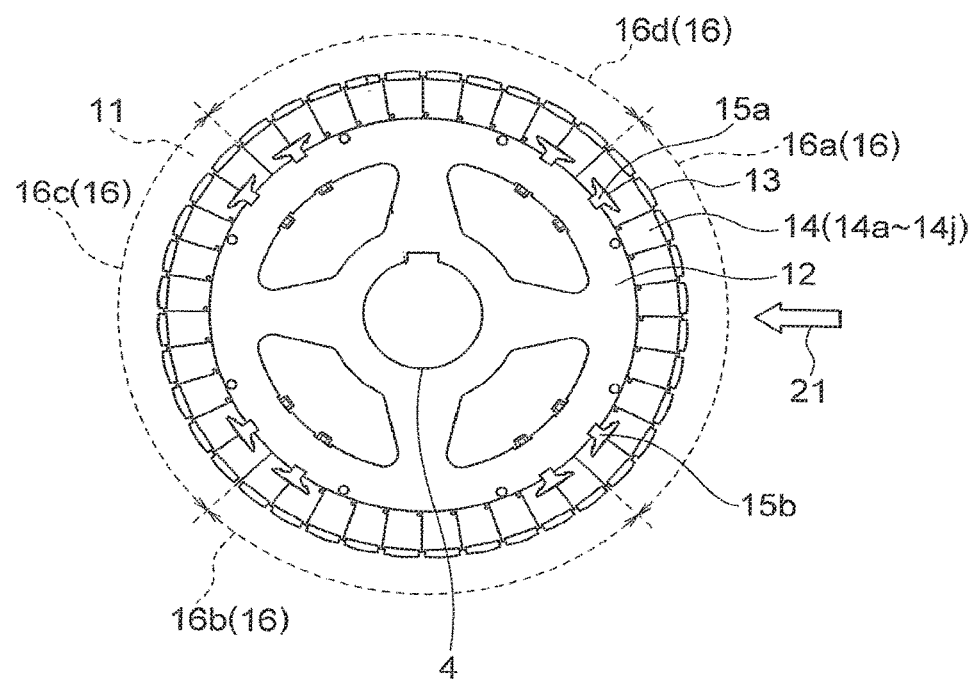
FIG. 1B is a plan view of a rotor in the rotating electric machine according to the first embodiment of the present invention.
Figure 2:
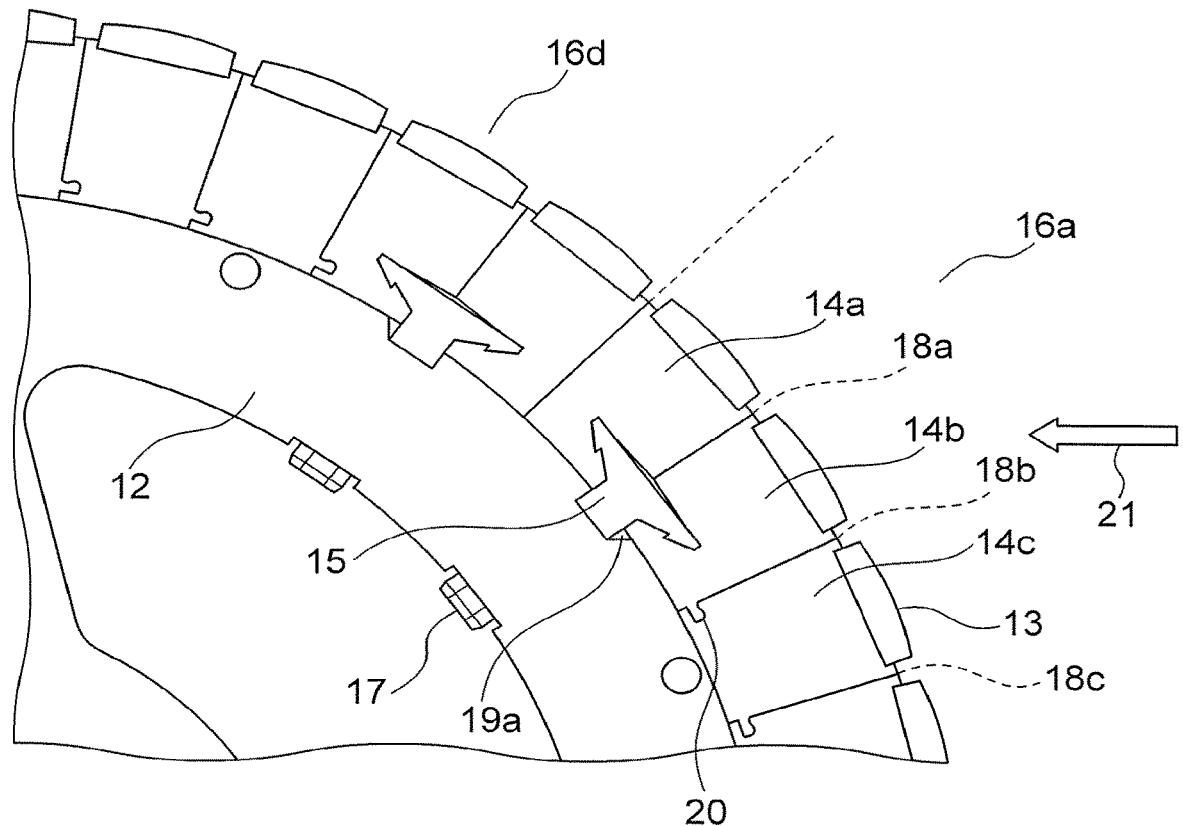
FIG. 2 is a partly enlarged view of the rotor in FIG. 1.

FIG. 1A is a plan view of a stator for a rotating electric machine according to a first embodiment of the present invention. FIG. 1B is a plan view of a rotor for the rotating electric machine according to the first embodiment of the present invention. FIG. 2 is an enlarged view of an essential part of the rotor 11 shown in FIG. 1B. An inner rotor type rotating electric machine 8 includes the stator (armature) 5 and the rotor 11. The stator 5 is fixed separately from the rotor 11 on the outer circumferential side of the rotor 11. The rotor 11 is fixed to a rotation shaft 4 on the inner circumferential side of the stator 5. A plurality of magnets 13 are assembled at equal intervals at the outer circumferential surface of the rotor main body 12 of the rotor 11 (at a surface opposed to the stator 5).

The stator 5 includes a stator core 6, a coil 7, and an insulator interposed therebetween (though not shown). The insulator is made for example of insulating paper or a resin part. The stator core 6 is provided with a plurality of grooves (slots) 9 for storing the coil 7 on an inner peripheral side thereof which is opposed to the rotor 11. The stator core 6 has magnet teeth 10 as many as the slots 9 that are arranged each between two slots to extend in the radially inner direction of the stator core 6.

The rotor 11 includes a rotor main body 12 fixed at the rotation shaft 4 and a plurality of magnet units 16. The plurality of magnet units 16 each have a magnet 13. The plurality of magnet units 16 are each discrete parts independent from one another. The magnet 13 is assembled on the outer circumferential side of the magnet unit 16. The plurality of magnet units 16 are fastened to the rotor main body 12 by a bolt 17. The rotor 11 shown in FIG. 1B has four magnet units 16a to 16d corresponding to four equal segments obtained by dividing the circumference.

The magnet units 16 each include a plurality of magnet teeth 14. The magnet teeth 14 each have a magnet 13 fixed on the outer circumferential side thereof for example by an adhesive.

Figure 3:
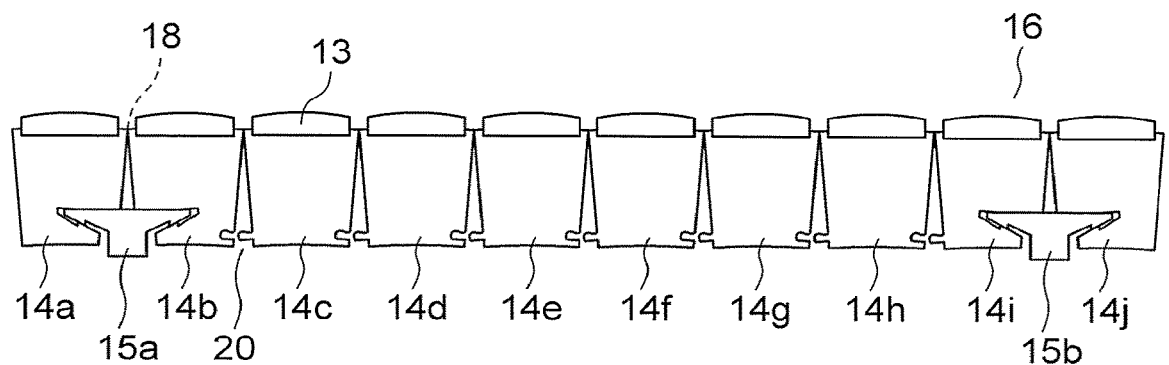
FIG. 3 is a view showing a magnet unit for the rotor in FIG. 1 in a linear arrangement.
Figure 4:
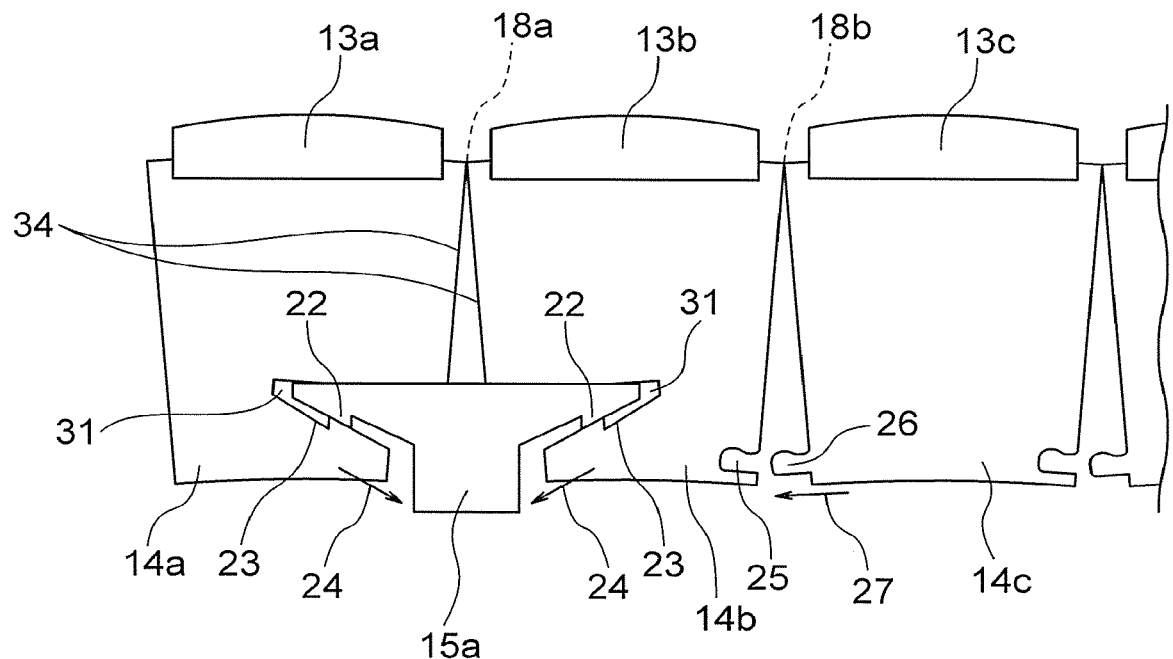
FIG. 4 is a partly enlarged view of the magnet unit in FIG. 3.

FIG. 3 is a view of the magnet unit 16 spread in a linear arrangement. FIG. 4 is an enlarged view of the magnet teeth 14a to 14c of the magnet unit 16 shown in FIG. 3 and their periphery. According to the embodiment, one magnet unit 16 includes ten magnet teeth 14a to 14j. Adjacent magnet teeth 14 are coupled by bridging parts 18 each having a thin coupling part on the outer circumferential side. The magnet unit 16 is bent around the bridging part 18 and the surfaces 34 of adjacent magnet teeth 14 abut against each other. In this way, the plurality of magnet teeth 14 form one magnet unit in a circular arc arrangement (one magnet teeth connection body).

As shown in FIG. 3, a press-fitting part 20 is provided between adjacent magnet teeth 14. As shown in FIG. 4, the press-fitting part 20 has a recessed part 25 at an end surface thereof on one side of the magnet tooth 14 and a raised part 26 at an end surface thereof on the other side. For example, when the adjacent magnet teeth 14b and 14c are bent in the direction of the arrow 27 around the bridging part 18, the raised part 26 of the magnet tooth 14c is press-fitted into the recessed part 25 of the magnet tooth 14b. In this way, the magnet teeth 14b and 14c are fixed in the circular arc arrangement.

Furthermore, when the magnet teeth 14 are arranged in a circular arc shape, adjacent magnets 13 attract each other, so that the position of the magnet unit 16 becomes stable.

Figure 5:
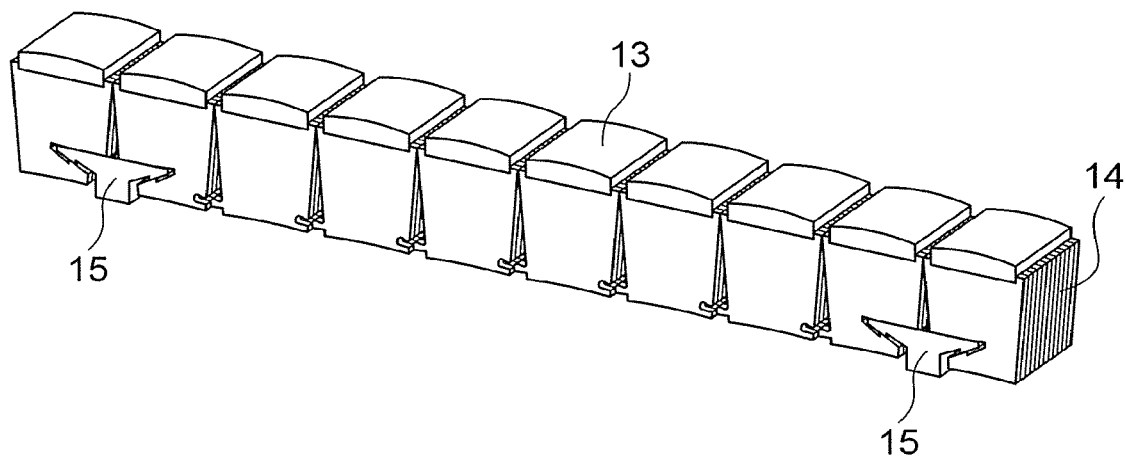
FIG. 5 is a perspective view of the magnet unit shown in FIG. 3.

The material of the magnet teeth 14 is for example an iron material with a high magnetic permeability in order to improve the efficiency of the rotating electric machine 8. The magnet teeth 14 are produced by wire-cutting a block material into the shape of magnet teeth 14. The magnet teeth 14 may be produced using lamination steel having layers of thin pressed plates in order to facilitate the manufacture of the thin bridging part 18. FIG. 5 is a view of a magnet unit 16 produced using lamination steel. It is difficult to provide threaded holes to the magnet teeth 14 when the magnet units 16 are produced using lamination steel. Therefore, fixation blocks 15 are assembled to the magnet unit 16, and the fixation blocks 15 and the rotor main body 12 are fixed by bolts 17 or the like.

Figure 6:
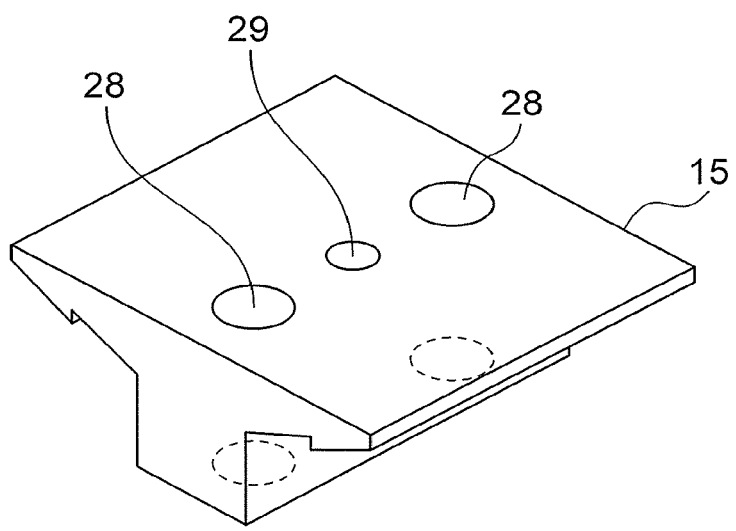
FIG. 6 is a perspective view of a fixation block that fastens the magnet unit and a rotor main body.

FIG. 6 is a view of an exemplary fixation block 15. The fixation block 15 in FIG. 6 has two threaded holes 28.

As shown in FIG. 4, adjacent magnet teeth 14a and 14b as a part of the magnet unit 16 are each provided with a notch 31 in a shape corresponding to the fixation block 15a. The fixation blocks 15 are inserted from side surfaces of the magnet teeth 14a and 14b when the magnet unit 16 is in a linear arrangement. The magnet unit 16 is bent around the bridging part 18 in the direction of the arrows 24. When the gap between the magnet teeth 14a and 14b is closed, the fixation block 15a is held between the magnet teeth 14a and 14b and fixed. The fixation block 15 has protrusions 22 on the left and right. The protrusions 22 are press-fitted into stepped parts 23 of the notches 31 when the gap between the magnet teeth 14a and 14b is closed. In this way, the magnet teeth 14a and 14b can be fixed so that the fixation block 15a does not come off from the magnet unit 16 and there is little gap between the magnet teeth 14a and 14b. In this way, the fixation block 15 can be fixed to the magnet unit 16 without the necessity of work such as welding and fastening. Note that according to the embodiment, the notches 31 are provided between the magnet teeth 14a and 14b and between the magnet teeth 14i and 14j, while the arrangement and number of notches 31 are not limited to the above. For example, the notch 31 needs only be provided at least between a pair of adjacent magnet teeth for each magnet unit 16.

The magnet unit 16 is assembled from the outside of the rotor main body 12 as indicated by the arrow 21 in FIG. 2. The fixation block 15 is inserted into a notch 19a provided in the rotor main body 12. Therefore, one side surface of the notch 19a is shaped to open toward the center of a corresponding magnet unit 16 so that the fixation block 15 does not interfere with the rotor main body 12 during assembling. More specifically, the side surface of the notch 19a closer to the center of the corresponding magnet unit 16 is inclined to the center of the corresponding magnet unit toward the radially outer side of the notch. The magnet units 16a to 16d each have two fixation blocks 15a and 15b. One side surface of one fixation block 15a and the uninclined side surface of the corresponding notch 19a abut against each other. One side surface of the other fixation block 15b (the side surface on the opposite side to the previously mentioned side surface of the fixation block 15a in the circumferential direction) and the uninclined side surface of the corresponding notch 19a abut against each other. In this way, the magnet unit 16 is positioned with respect to the rotor main body 12.

According to the embodiment, two fixation blocks 15 are used for one magnet unit 16, while three or more fixation blocks 15 may be used. In this case, the positioning can be carried out in the same manner using two of the fixation blocks 15.

Figure 7:
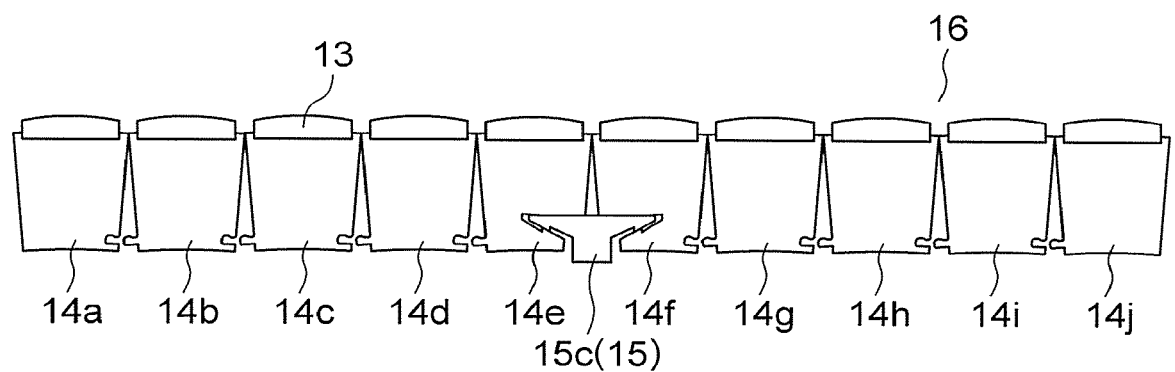
FIG. 7 is a view of another mode of a magnet unit according to a first embodiment.
Figure 8:
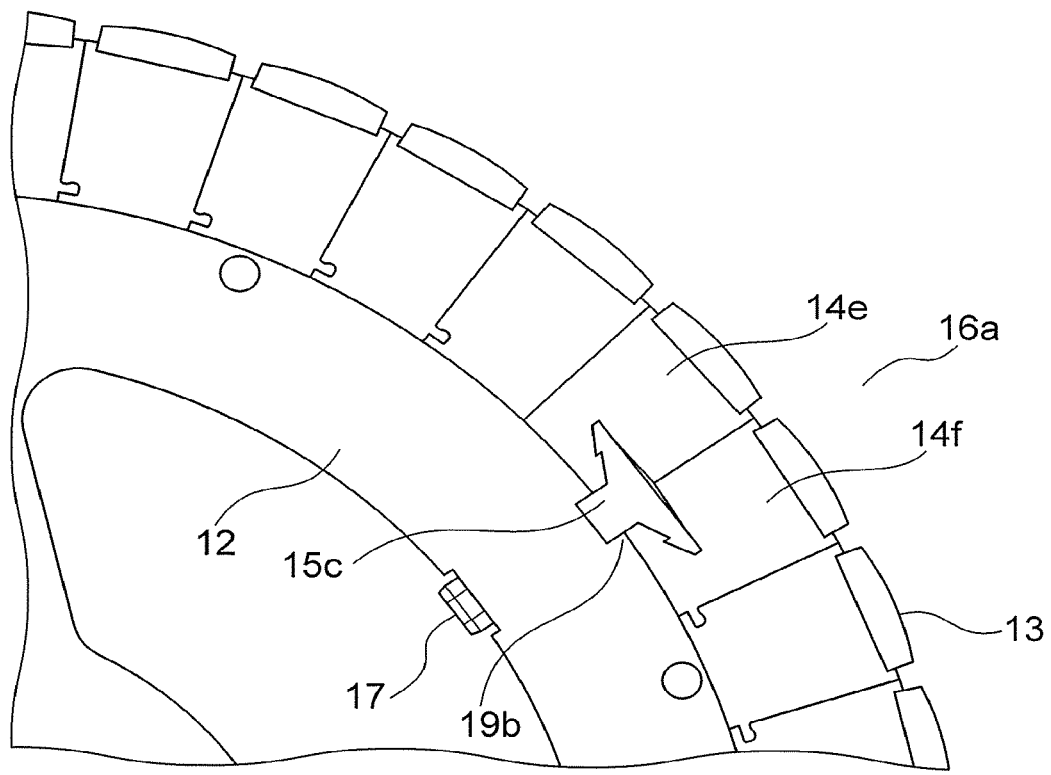
FIG. 8 is a partly enlarged view of the magnet unit shown in FIG. 7 when assembled to the rotor main body.

As shown in FIG. 7, one fixation block 15c may be used for one magnet unit 16. In this case, the magnet unit 16 is assembled to the rotor main body 12 in the direction in which the fixation block 15c protrudes from the magnet unit 16. The groove in the rotor main body 12 is shaped to conform to the protrusion of the fixation block 15c that protrudes from the magnet unit 16 like the notch 19b in FIG. 8. In this manner, the protrusion of the fixation block 15c serves as a key, so that the rotor main body 12 and the magnet unit 16 can be positioned with respect to each other. In FIG. 8, one fixation block 15c is provided in the center of a corresponding magnet unit 16.

The arrangements shown in FIGS. 3 and 7 both allow the magnet unit 16 and the rotor main body 12 to be positioned without the necessity of preparing a separate positioning part such as a key.

In order to position the rotor main body 12 and the magnet unit 16 in the axial direction, the fixation block 15 may be provided with a pin hole 29 as shown in FIG. 6, and pin holes corresponding to this may be provided at the notches 19a and 19b of the rotor main body 12.

Figure 9:
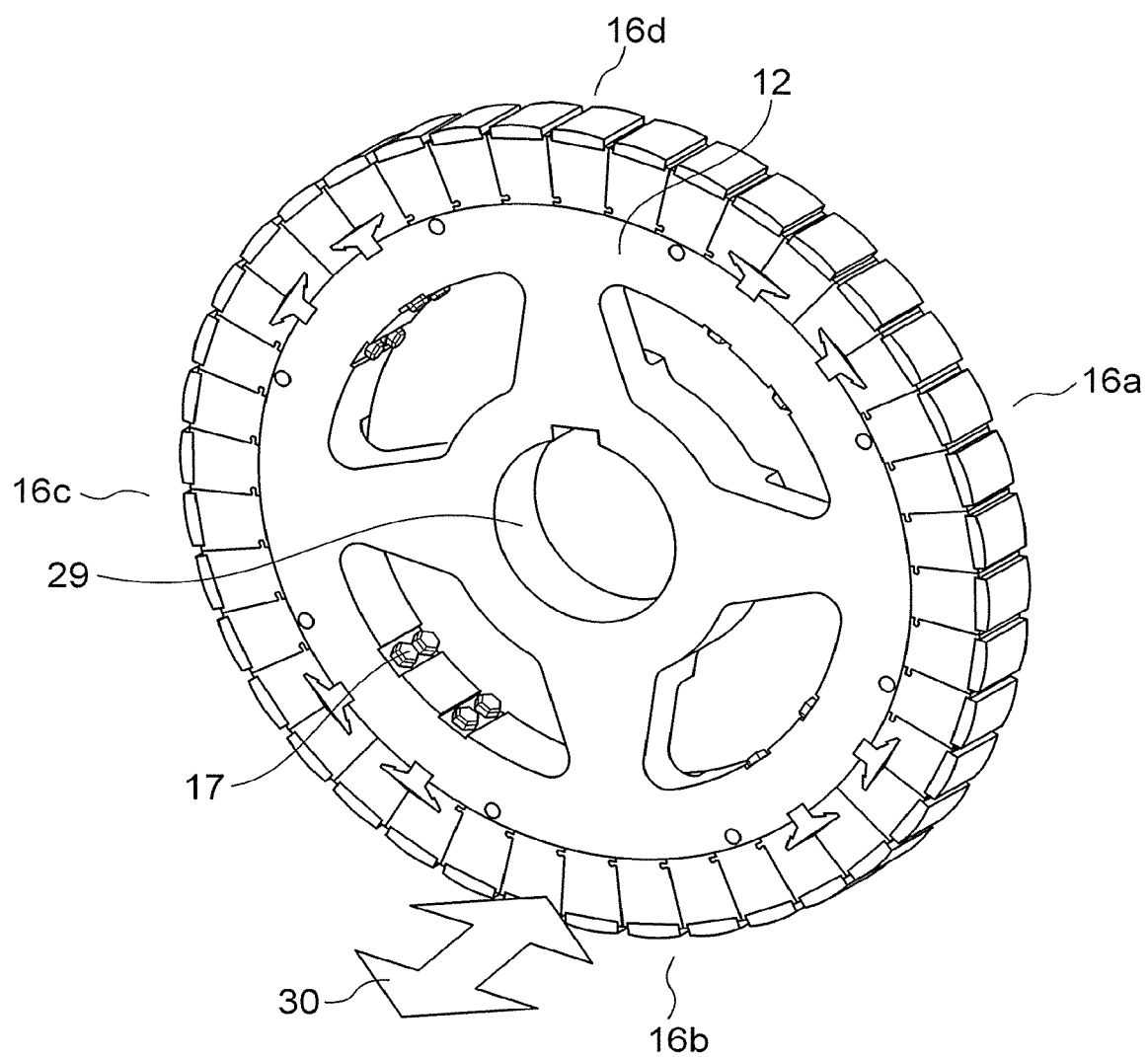
FIG. 9 is a perspective view of another method for disassembling/assembling the magnet unit shown in FIG. 1B.

FIG. 9 is a view for illustrating another method for disassembling/assembling the magnet units 16. The magnet unit 16 can be assembled/disassembled to/from the rotor main body 12 by sliding the unit in the axial direction indicated by the arrow 30 in FIG. 9. Instead of an existing rotor, for example a rotor 11 according to the invention may be incorporated in the rotating electric machine 8. In this way, the magnet unit 16 can be disassembled/assembled independently from the rotor main body 12, the rotation shaft 4, and the stator 5 also in the existing rotating electric machine 8.

When the rotor 11 is produced according to the disassembling/assembling method, the rotor main body 12 may have a groove shaped to have an unopened side surface like the notch 19b even if the magnet unit 16 has a plurality of fixation blocks 15. The magnet unit 16 and the rotor main body 12 may be positioned using one of the plurality of fixation blocks 15.

As described above, in the rotor 11 according to the first embodiment, the rotor main body 12 and the magnet units 16 are divided into segments. Therefore, the work of assembling the magnets 13 may be carried out for each magnet unit 16. Furthermore, the magnet units 16 may be provided in a linear arrangement in which the magnet assembling surfaces are aligned, which facilitates the assembling work. The presence of the fixation blocks 15 allows the magnet units 16 to be positioned and fastened at the same time. Therefore, a separate part such as a key is not necessary. The fixation blocks 15 and the magnet units 16 can be assembled simply by press-fitting work. Therefore, the rotor main body 12 and the magnet units 16 can be assembled more precisely and easily without the necessity of welding or fastening by bolts. In this way, the work characteristics of the rotating electric machine 8 can be stable.

In the rotor 11 according to the first embodiment, the magnet units 16 can be disassembled/assembled separately without disassembling the rotating electric machine 8. This facilitates the repair/maintenance work for the rotating electric machine 8, so that the work period and cost can be reduced.

Figure 10:
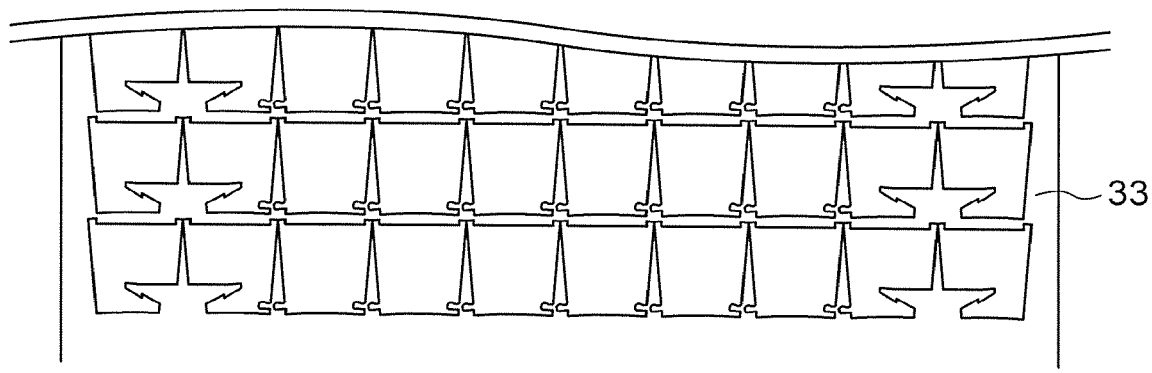
FIG. 10 is a view for illustrating material blanking in press-processing the magnet unit.

Furthermore, when the magnet units 16 are produced using lamination steel, a steel plate 33 is blanked according to a linear layout as shown in FIG. 10. In this way, progressive press processing can be carried out, so that an improved material yield can be achieved. In addition, desired profile irregularities at the magnet assembling surface and at the surface of assembly with the rotor main body 12 and desired roundness for the magnet units 16 formed in a circular arc arrangement can easily be secured. Therefore, the rotor can be produced inexpensively.

Second Embodiment

A second embodiment of the present invention will be described with reference to FIGS. 11 to 15. Note that the second embodiment is identical to the first embodiment except for the features described in the following. The portions of this embodiment corresponding to those of the first embodiment that will not be particularly described are designated by reference numerals having the same numbers on the last two digits as those of the first embodiment.

Figure 11:
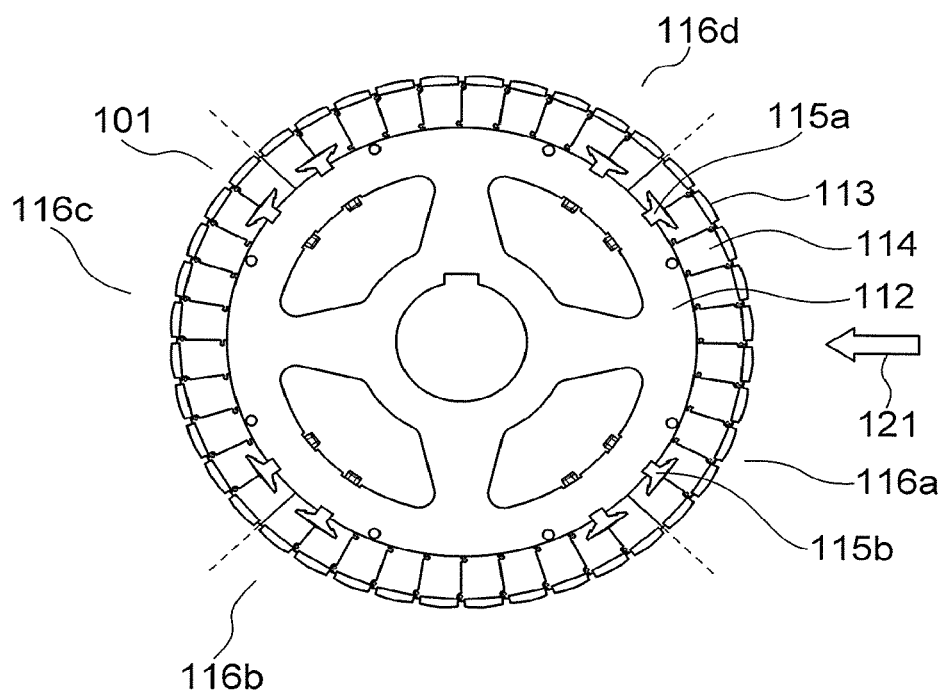
FIG. 11 is a plan view of a rotor according to a second embodiment of the present invention.
Figure 12:
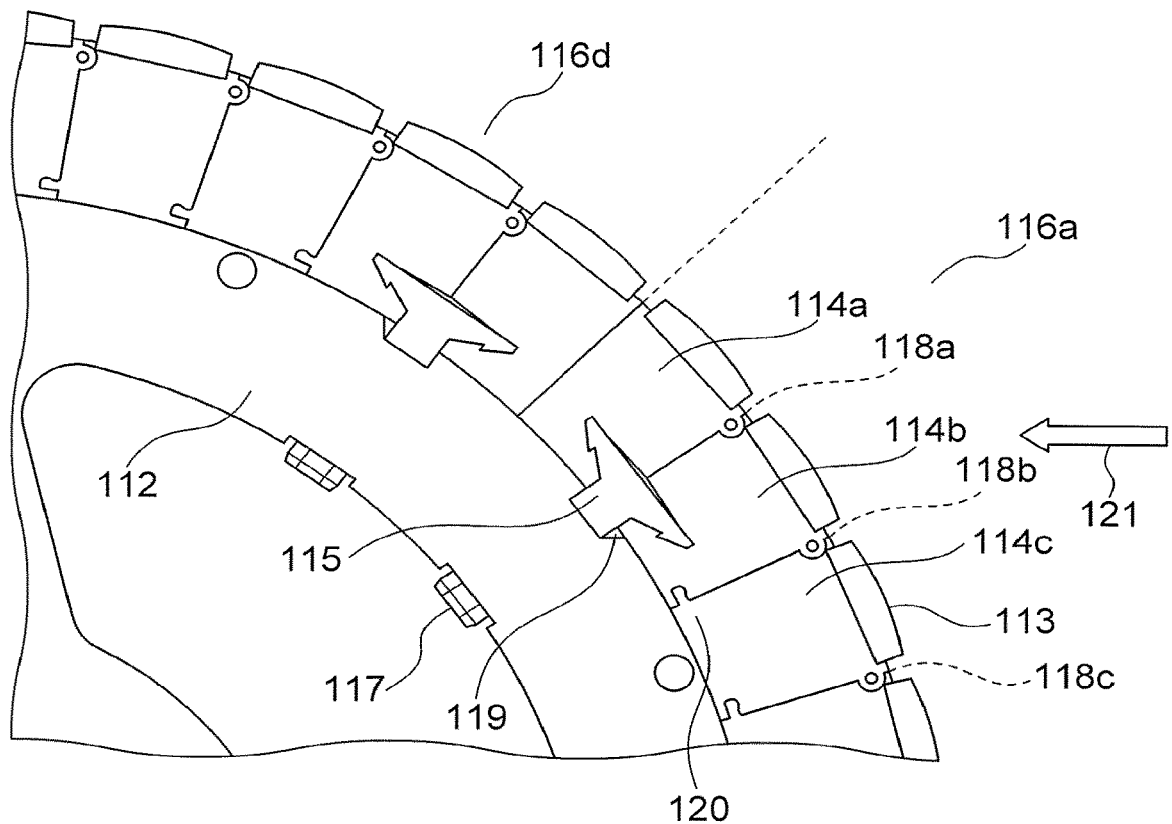
FIG. 12 is a partly enlarged view of the rotor shown in FIG. 11.

FIG. 11 is a plan view of a rotor 101 according to the second embodiment. FIG. 12 is a partly enlarged view of the rotor 101 according to the second embodiment.

Similarly to the rotor 11, the rotor 101 includes a rotor main body 112 fixed to a rotation shaft 4 and a plurality of magnet units 116a to 116d. The plurality of magnet units 116a to 116d each have a magnet 113. The plurality of magnet units 116a to 116d are discrete parts from one another. A magnet 113 is assembled on the outer circumferential side of a corresponding magnet unit 116. The plurality of magnet units 116a to 116d are fastened to the rotor main body 112 by bolts 117. The protrusions of fixation blocks 115 that protrude from the plurality of magnet units 116a to 116d are fitted into grooves 119 provided at the rotor main body 112 and positioned.

Figure 13:
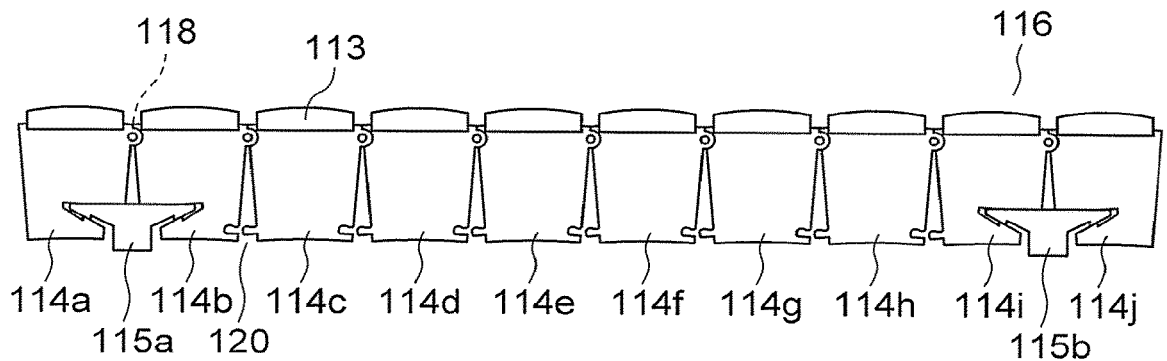
FIG. 13 is a view of the magnet unit for the rotor shown in FIG. 11 in a linear arrangement.
Figure 14:
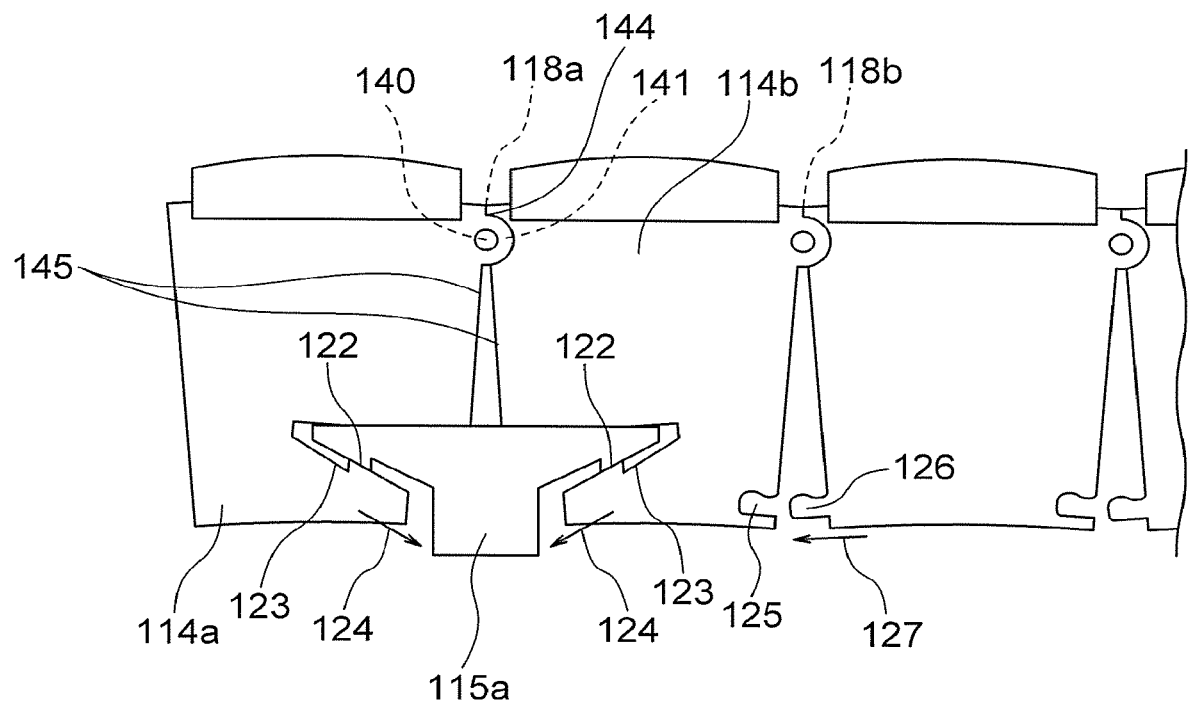
FIG. 14 is a view of first type magnet teeth in the magnet unit in FIG. 13.
Figure 15:
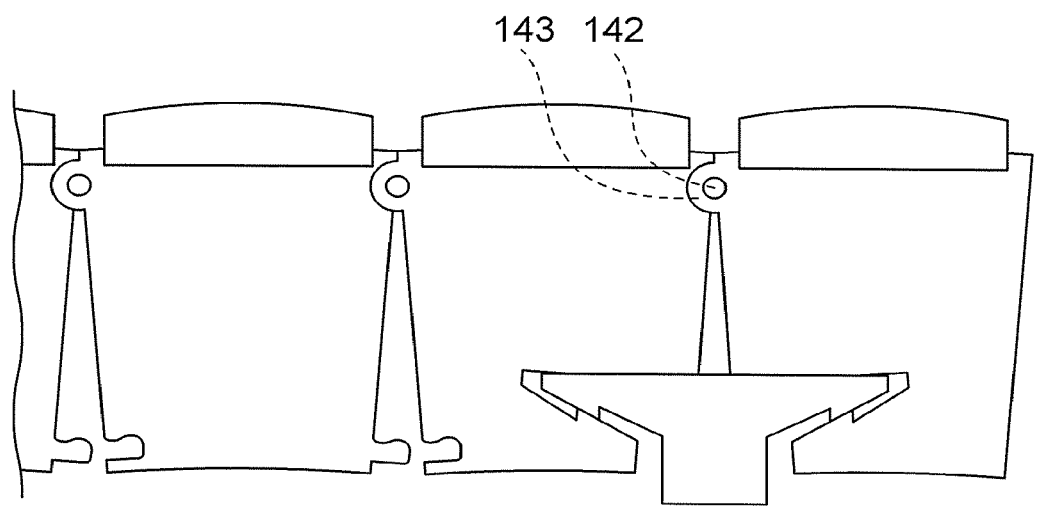
FIG. 15 is a view of second type magnet teeth in the magnet unit in FIG. 13.

FIG. 13 is a view of the magnet unit 116 spread in a linear arrangement. FIGS. 14 and 15 are partly enlarged views of the magnet unit 116 shown in FIG. 13. FIG. 14 shows first type magnet teeth 114, and FIG. 15 shows second type magnet teeth 114.

Adjacent magnet teeth 114 are not connected by a bridging part. The individual magnet teeth 114 are in a separated state from one another and then coupled in the following manner. A magnet unit 116 includes a plurality of magnet teeth 114 coupled by joints 118. According to the embodiment, the magnet unit 116 includes ten coupled magnet teeth 114. A magnet 113 is assembled on the outer peripheral side of each of the magnet teeth 114.

The magnet teeth 114 are made from lamination steel. The magnet teeth 114 include at least the first type magnet teeth 114 shown in FIG. 14 and the second type magnet teeth 114 shown in FIG. 15. The first type magnet tooth 114 has a shaft part 140 at a protrusion 141 at an end surface thereof on one side in the peripheral direction. The second type magnet tooth 114 has a shaft part 142 at a protrusion 143 at an end surface thereof on the other side in the peripheral direction. The magnet unit 116 is formed by fitting the shaft parts 140 of the first type magnet teeth 114 and the shaft parts 142 of the second type magnet teeth 114 with each other. Now, the magnet unit 116 according to the second embodiment will be described in more detail. In FIG. 13, a layer of the first type magnet teeth 114 arranged in the transverse direction appears on the surface. The shaft part 140 of a first type magnet tooth 114a is fitted with the shaft part 142 of a second type magnet tooth 114 hidden at the backside of a magnet tooth 114b adjacent to the magnet tooth 114a. The shaft parts 140 and 142 are formed by press-processing. The shaft parts 140 and 142 serve as raised parts on the front side and as recessed parts on the rear side.

In the magnet unit 116, adjacent magnet teeth 114 can rotate relative to each other around the shaft part 140 of the first type magnet tooth 114 and the shaft part 142 of the second type magnet tooth 114. The adjacent magnet teeth 114 can rotate in the direction of moving away from each other, in other words in the direction opposite to the direction indicated by the arrow 124 until their respective surfaces 144 abut against each other. At the time, the adjacent magnets 113 attract each other because of their different magnetic polarities, while the surfaces 144 serve as stoppers and prevent the magnets from contacting each other. The adjacent magnet teeth 114 can rotate in the direction of moving closer to each other, in other words, in the direction indicated by the arrow 124 until their respective surfaces 145 abut against each other. When the joint 118 is rotated to a position where their respective surfaces 145 abut against each other, the adjacent magnet teeth 114 are arranged in a circular arc shape. In this way, the linear arrangement of the magnet units 116 shown in FIG. 13 is changed to the circular arc arrangement.

When the joints 118 of the magnet teeth 114 are rotated in the direction indicated by the arrow 124, attraction force acts upon the adjacent magnets 113 in the direction in which the gap between the magnet teeth 114 is reduced. Therefore, the magnet teeth 114 are stable in the circular-arc position. The circular arc position of the magnet unit 116 can be kept more stably by additionally using a press-fitting part 120 similarly to the first embodiment.

Using the structure with the joints 118 for coupling between the magnet teeth 114 similarly to the second embodiment, the same advantageous effects as those of the first embodiment can be provided.

Third Embodiment

A rotor according to a third embodiment of the present invention will be described in conjunction with FIGS. 16 to 19. Note that this embodiment is identical to the first or second embodiment except for the features described in the following. The portions of the embodiment corresponding to those of any of the previously described embodiments that will not be particularly described are designated by reference numerals having the same numbers on the last two digits as those of the corresponding embodiment.

Figure 16:
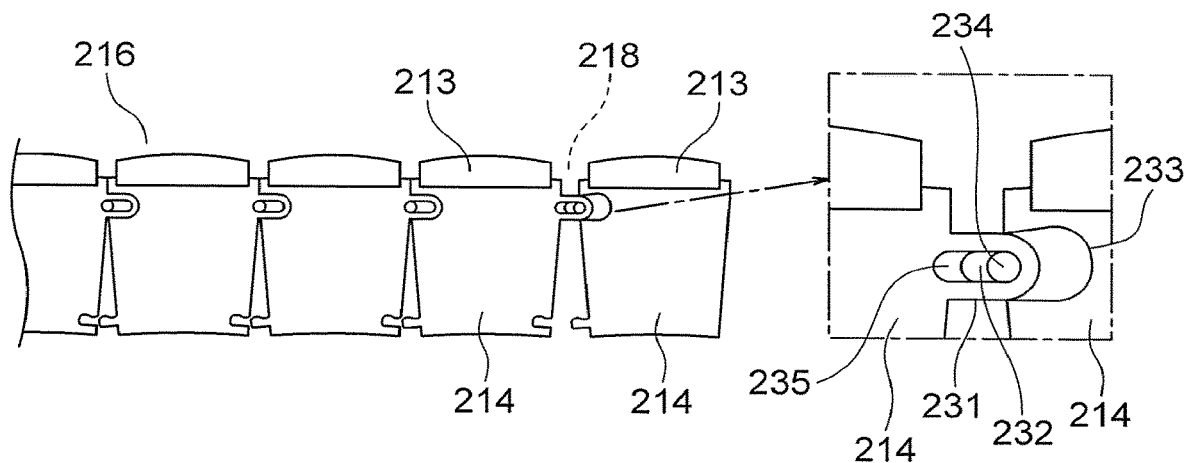
FIG. 16 is a view of a magnet unit for a rotor according to a third embodiment of the present invention in a linear arrangement.
Figure 17:
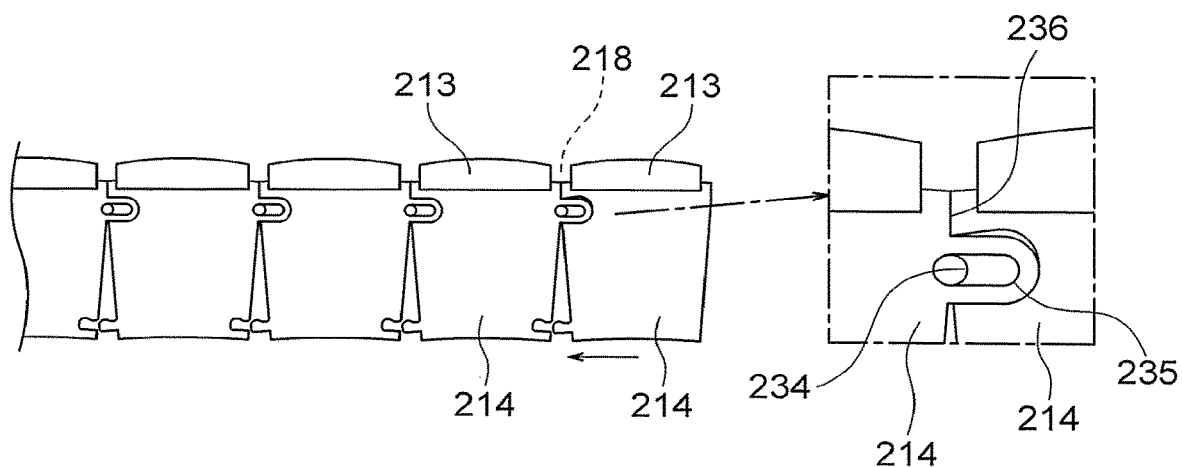
FIG. 17 is a view of a first modification of the magnet unit in FIG. 16.
Figure 18:
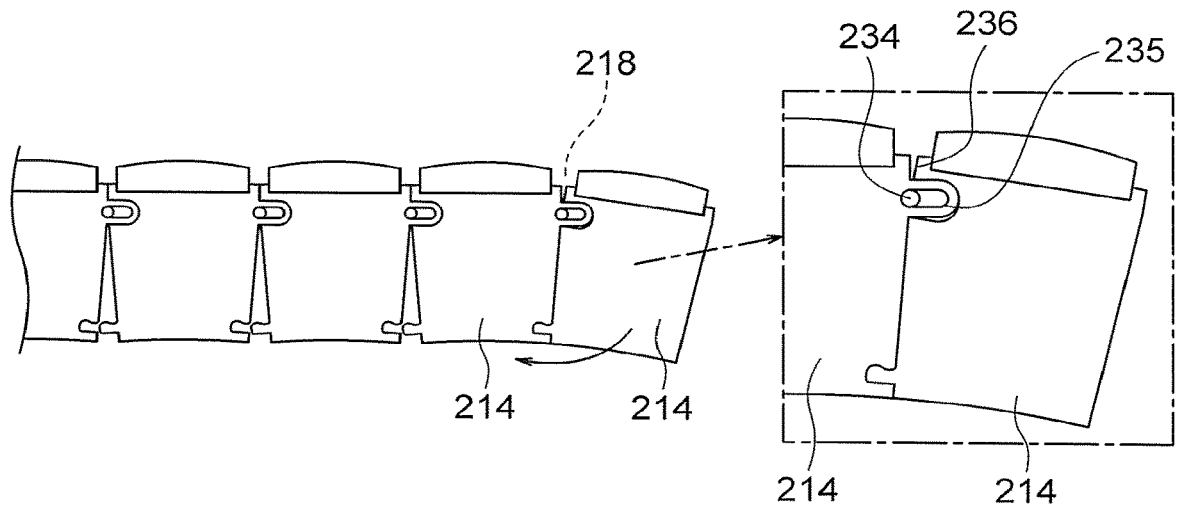
FIG. 18 is a view of a second modification of the magnet unit in FIG. 16.

FIG. 16 is a partly plan view of a magnet unit 216 according to the third embodiment. FIG. 17 is a partly plan view of the magnet unit 216 in FIG. 16 in a first modification state. FIG. 18 is a partly plan view of the magnet unit 216 in FIG. 16 in a second modification state.

The magnet unit 216 includes a plurality of coupled magnet teeth 214. Joints 218 are provided at the coupling parts of the plurality of magnet teeth 214.

The magnet teeth 214 are made from lamination steel. The magnet teeth 214 include third type magnet teeth 214 and fourth type magnet teeth 214. The third type magnet teeth 214 each have a long hole 235 at a protrusion 231 at an end surface thereof on one side in the peripheral direction. The fourth type magnet teeth 214 each have a shaft part 234 at a protrusion 232 at an end surface thereof on the other side in the peripheral direction. The long holes 235 of the third type magnet teeth 214 and the shaft parts 234 of the fourth type magnet teeth 214 are fitted with each other.

Between adjacent magnet teeth 214, the shaft part 234 slides along the long hole 235 in the direction indicated by the arrow in FIG. 17. In this way, there can be an expansion position in which the gap between the adjacent magnet teeth 214 is large and a reduction position in which the gap between the adjacent magnet teeth 214 is small. The fourth type magnet tooth 214 is provided with a recessed part 233 for avoiding interference with the protrusion 231 of the third type magnet tooth 214 in the reduction position in which the gap between the adjacent magnet teeth 214 is small. Although not shown, the third type magnet tooth 214 is also provided with a recessed part for avoiding interference with the protrusion 232 of the fourth type magnet teeth 214 in the reduction position. Adjacent magnet teeth 214 can rotate around the shaft part 234 in the direction indicated by the arrow in FIG. 18.

Figure 19:
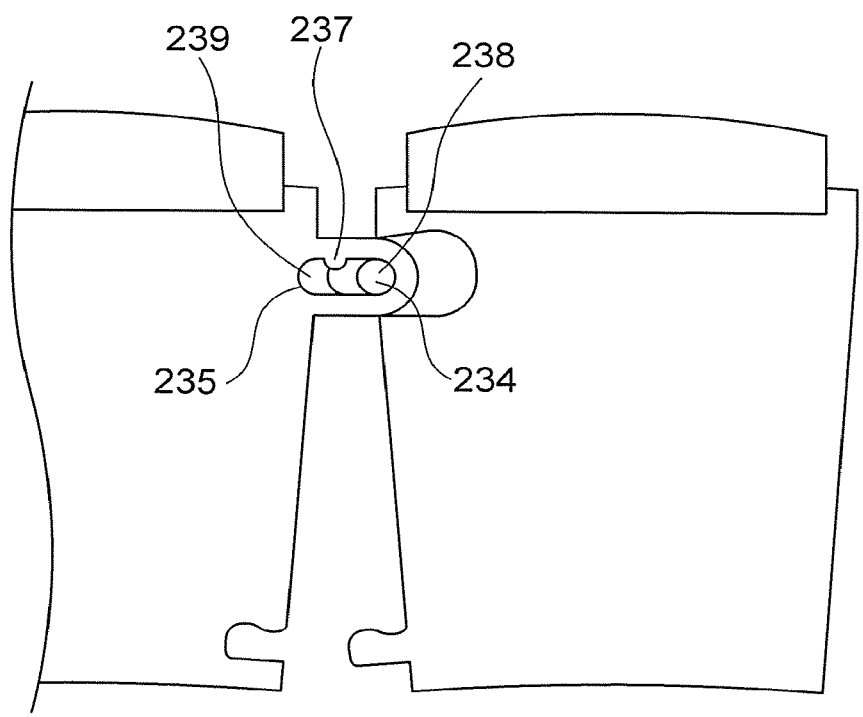
FIG. 19 is a view of a long hole according to the third embodiment additionally provided with a raised part.

As shown in FIG. 19, the long hole 235 may be provided with a raised part 237, and the region of the long hole 235 may be divided into the expansion position 238 and the reduction position 239. During the movement of the shaft part 234 from the expansion position 238 to the reduction position 239 along the long hole 235, a press-fitted state is attained. The shaft part 234 is released from the press-fitted state in the reduction position 239. The raised part 237 restrains the shaft part 234 from returning toward the expansion position 238 from the reduction position 239. In this way, the shaft part 234 can be positioned in the reduction position 239 and rotate more stably.

As described above, the magnet unit 216 according to the third embodiment can provide the same advantageous effects as those of the first and second embodiments.

In general, as the magnetic force of the magnet 213 is stronger, a more compact and efficient rotating electric machine 8 can be provided. However, when the magnets 213 are assembled to the rotor, adjacent magnets 213 attract each other because of the strong magnetic force, which lowers the workability. According to the embodiment, adjacent magnet teeth 214 can be positioned in the expansion position 238. Therefore, the magnets 213 can be assembled in a position apart from the adjacent magnets 213, which improves the workability. When the joints 218 are slid to the reduction position and the joints 218 are rotated to provide a circular arc shape as shown in FIG. 18, the attraction force between the adjacent magnets 213 allows the position after the arrangement change to be stable. This facilitates the work of changing the arrangement of the magnet units 216. More specifically, a rotor structure with high production workability can be provided.

Now, modifications of the above-described embodiments will be described. The modification is identical to any of the first to third embodiments except for the features described in the following.

Figure 20A:
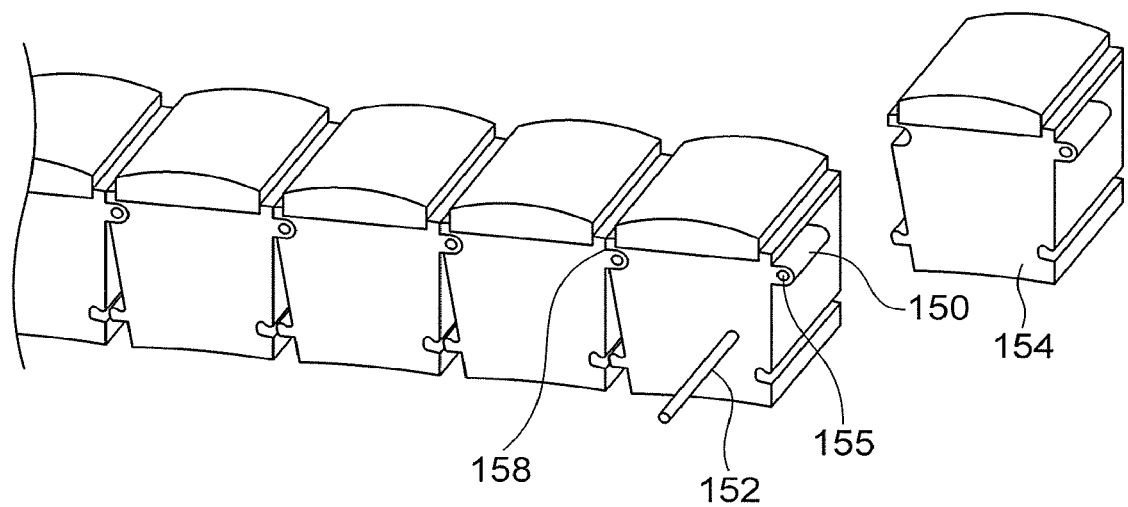
FIG. 20A is a view for illustrating another mode of the second embodiment of the present invention.
Figure 20B:
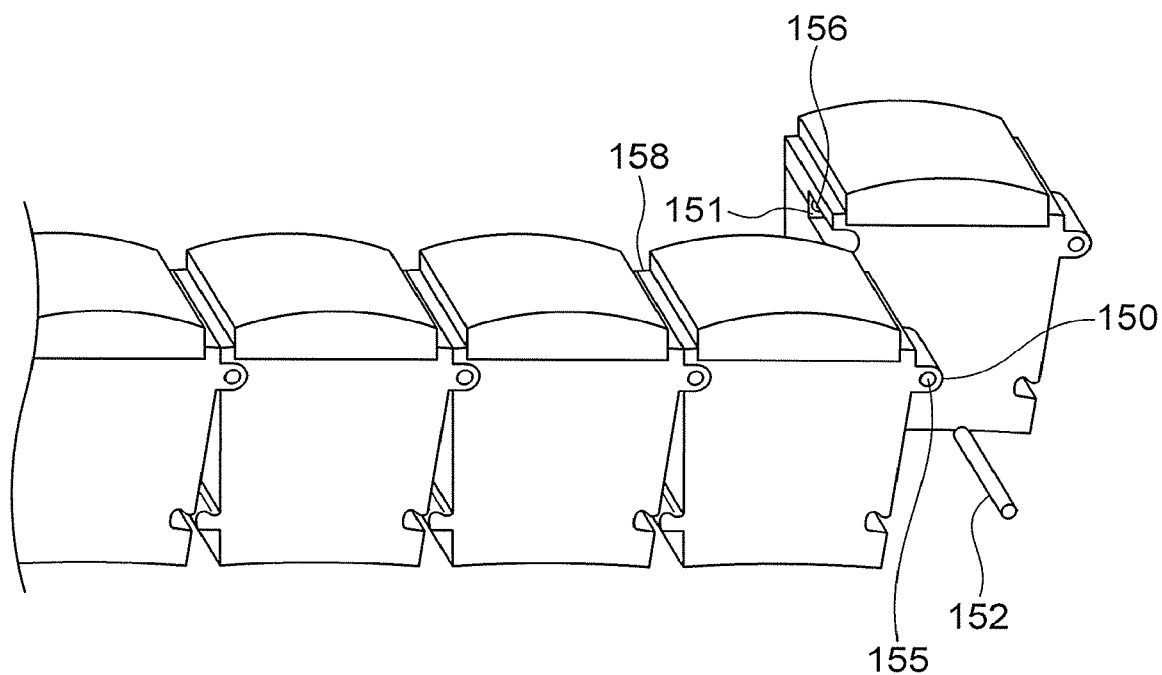
FIG. 20B is a view of the arrangement in FIG. 20A as viewed at a different angle.

According to the second and third embodiments, the magnet teeth 114 and 214 are made from lamination steel, while the magnet teeth 114 and 214 may be produced by wire-cutting or cutting a block material. FIGS. 20A and 20B show an example in which the magnet unit according to the second embodiment is produced using a block material. In the example, adjacent magnet teeth 154 are not connected by a bridging part. The magnet teeth 154 each have a first hole 155 having a circular section at a protrusion 150 at an end surface thereof on one side instead of the shaft part 140. The adjacent magnet tooth 154 has a second hole 156 having the same diameter as that of the first hole 155 at a coupling part (a protrusion/relative protrusion) 151 at an end surface thereof on the other side. A pin 152 is press-fitted in the first hole 155 and the second hole 156 for coupling. In this way, the adjacent magnet teeth 154 can be rotated relative to each other around a joint 158. Therefore, the same advantageous effects as the second embodiment can be provided.

The first hole 155 of the protrusion 150 may be formed like the long hole 235 according to the third embodiment. The pin 152 is inserted into the long hole-shaped first hole 155 and press-fitted in the second hole 156. In this way, the same advantageous effects as those of the third embodiment can be provided. In this case, only one of the first hole 155 and the second hole 156 is formed into a long hole, and the other may be a circular hole. The first hole 155 or the second hole 156 formed into a long hole may be provided with a part in the same shape as the raised part 237 shown in FIG. 19. The region of the long hole may be separated into an expansion position and a reduction position. In this way, similarly to the third embodiment shown in FIG. 19, the raised part restrains the pin 152 from returning toward the expansion position from the reduction position. Therefore, more stable rotation can be achieved in the reduction position.

According to the first to third embodiments of the present invention, the iron material is used for the magnet units, while the material of the magnet units may be any material with high magnetic permeability other than iron such as copper.

The rotor according to any of the embodiments of the present invention includes four magnet units corresponding to four equal segments obtained by dividing the circumference, but the number of the magnet units may be an arbitrary number equal to or more than one. Regardless of the number of the magnet units, the same advantageous effects as those of any of the embodiments can be provided. The magnet units according to the embodiments of the invention have the same number of magnet teeth but the magnet units may have different numbers of magnet teeth.

The magnet units according to the embodiments of the present invention each include ten coupled magnet teeth but the number of magnet teeth is not limited to the above. For example, two or more magnet teeth may be coupled.

In the magnet unit according to the present invention, the fixation block and the rotor main body are fixed by a bolt, while any other fixation method such as welding and press-fitting may be used.

Figure 21:
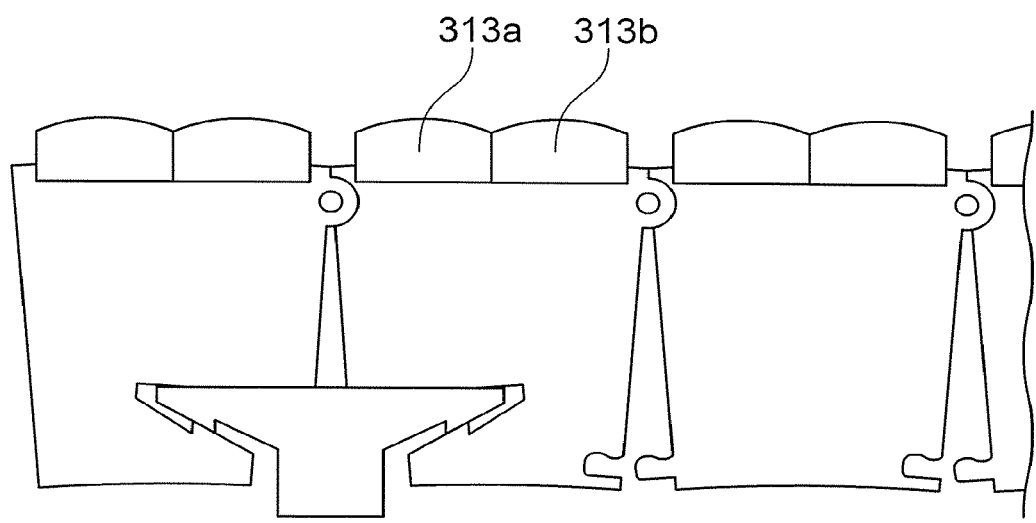
FIG. 21 is a view of a plurality of magnets assembled to one magnet teeth according to the second embodiment of the present invention.

In the magnet unit according to the present invention, one magnet is assembled for each of magnet teeth, but the number of magnets is not limited to the above. For example, as shown in FIG. 21, a plurality of magnets 313a and 313b may be assembled for each of the magnet teeth in the circumferential direction or/and the axial direction.

Figure 22:
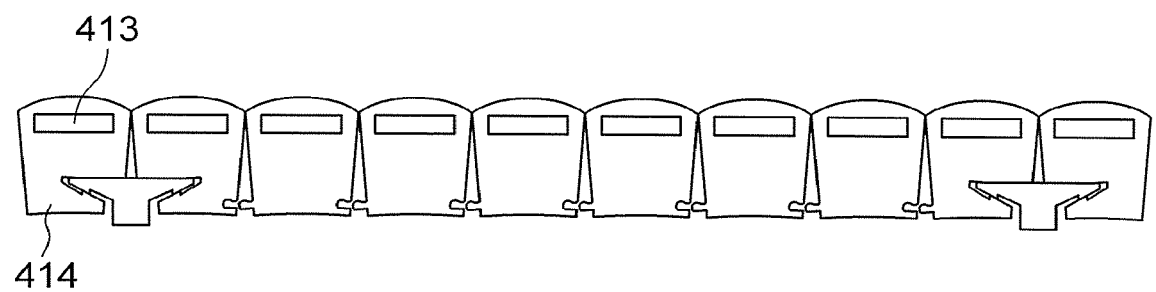
FIG. 22 is a view of an exemplary IPM rotor in which the rotor according to the first embodiment of the invention is used.

According to the embodiments of the present invention, an SPM rotor is illustrated as an example, while an IPM rotor having magnets 413 incorporated within magnet teeth 414 as shown in FIG. 22 may be used.

The first to third embodiments of the present invention have been described by referring to an inner rotor type rotating electric machine in which the stator is provided on the outer circumferential side and the rotor is provided on the inner circumferential side, while the kind of the rotating electric machine is not limited to the above. For example, the invention may be applied to any of other kinds of rotating electric machines such as an axial gap type machine and an outer rotor type machine when magnet units 516 and 616 are arranged as shown in FIGS. 23 to 30.

Figure 23:
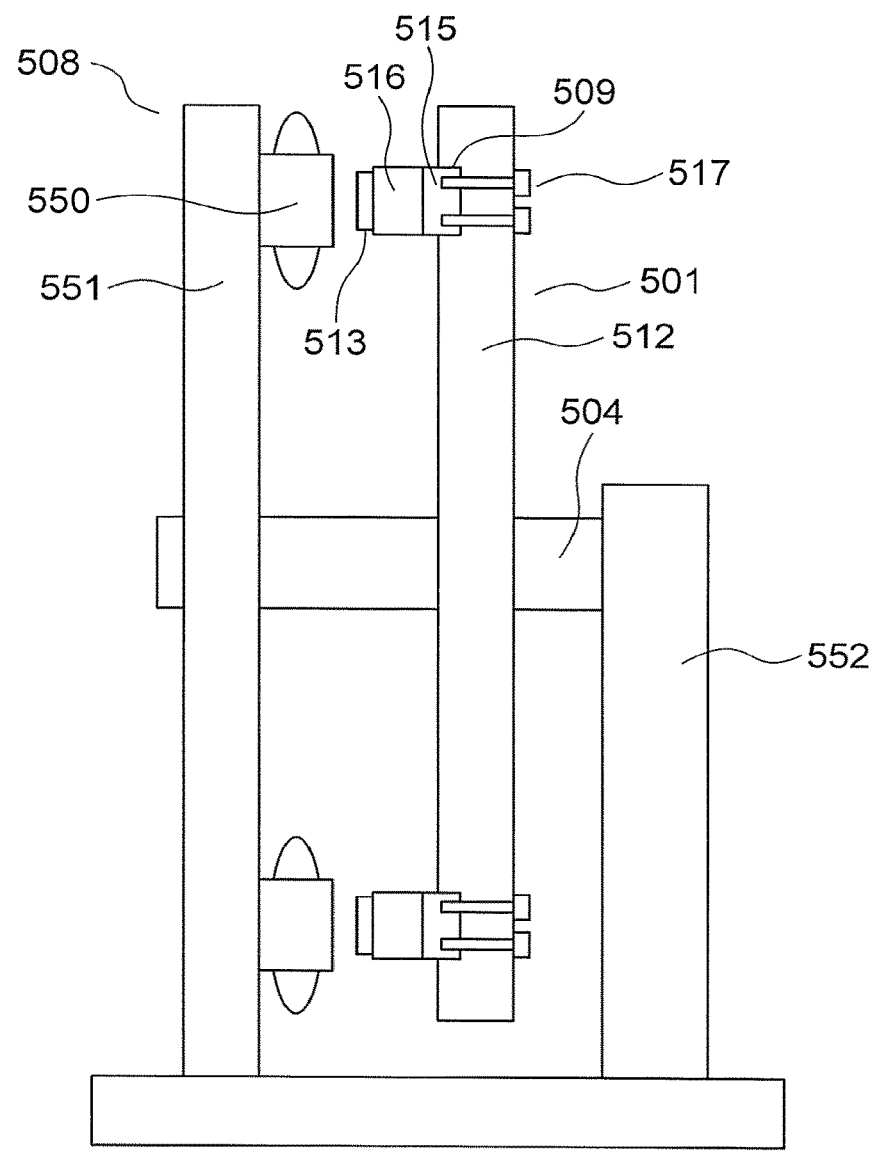
FIG. 23 is a view of an exemplary axial gap type rotating electric machine in which the rotor according to the first embodiment of the present invention is used.
Figure 24:
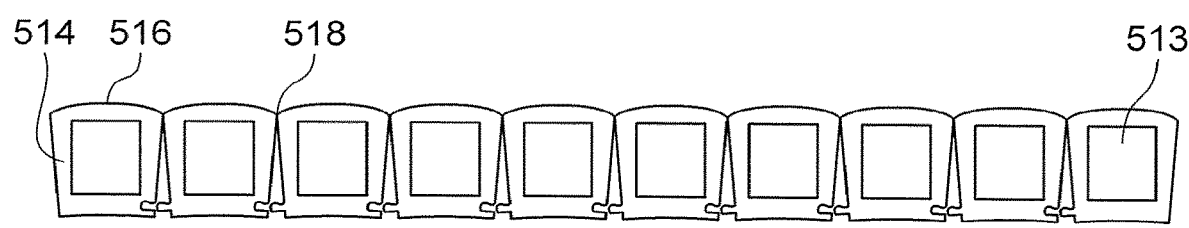
FIG. 24 is a view of a magnet unit for the rotor in FIG. 23.
Figure 25:
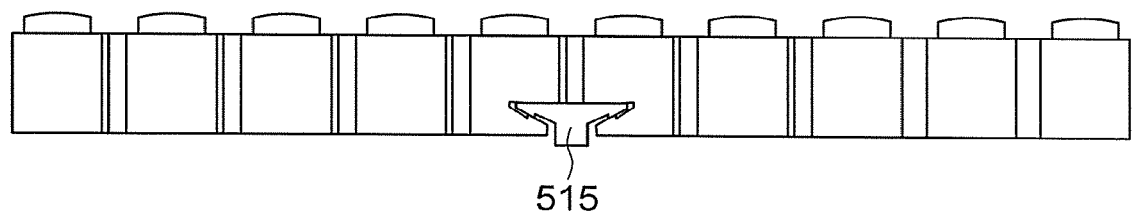
FIG. 25 is a side view of the magnet unit shown in FIG. 24.
Figure 26:
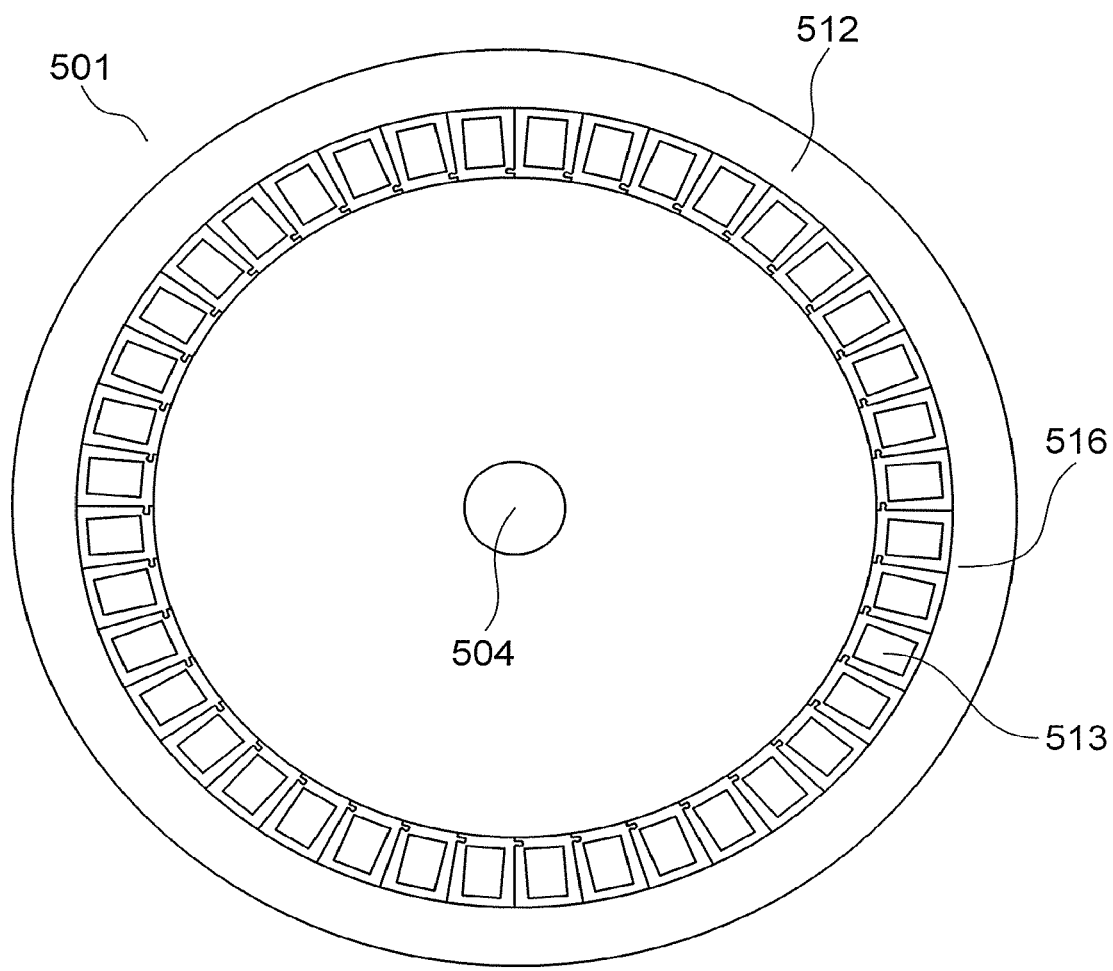
FIG. 26 is a view of the rotor in FIG. 23 as viewed from the stator side.

FIGS. 23 to 26 show an exemplary axial gap type rotating electric machine to which the present invention is applied. FIG. 23 is a side view of an axial gap type rotating electric machine 508. FIG. 24 shows a magnet unit 516 spread in a linear arrangement. FIG. 25 is a side view of the magnet unit 516 shown in FIG. 24. FIG. 26 is a view of the rotor 501 of the rotating electric machine 508 in FIG. 24 as viewed from the surface side opposite to a stator 550. Similarly to the first embodiment, the magnet unit 516 includes a plurality of magnet teeth 514 coupled by bridging parts 518. Then, the bridging parts 518 are bent to arrange the magnet teeth units 516 as a whole into a circular arc shape. A magnet 513 is assembled to an end surface of each of the magnet teeth in the axial direction. The magnet unit 516 has a fixation block 515 fitted and secured on the inner side thereof. The fixation block 515 protrudes from an end surface in the axial direction on the side opposite to the surface having the magnet 513 of the magnet unit 516 assembled thereon. The fixation block 515 is fitted into a notch provided at a rotor main body 512 and fastened by a bolt 517, and the rotor 501 is thus formed. The rotor 501 is fixed to a rotation shaft 504. The rotation shaft 504 is provided at a very small gap distance in the axial direction from the stator 550 which is independently fixed and the rotating electric machine 508 is thus formed.

More specifically, the magnet unit 516 is connected to the rotor main body 512 in the axial direction of the rotor 501 and provided at a gap distance from the stator 550 in the axial direction of the rotor 501.

FIGS. 27 to 30 show an exemplary outer rotor type rotating electric machine to which the present invention is applied.

Figure 27:
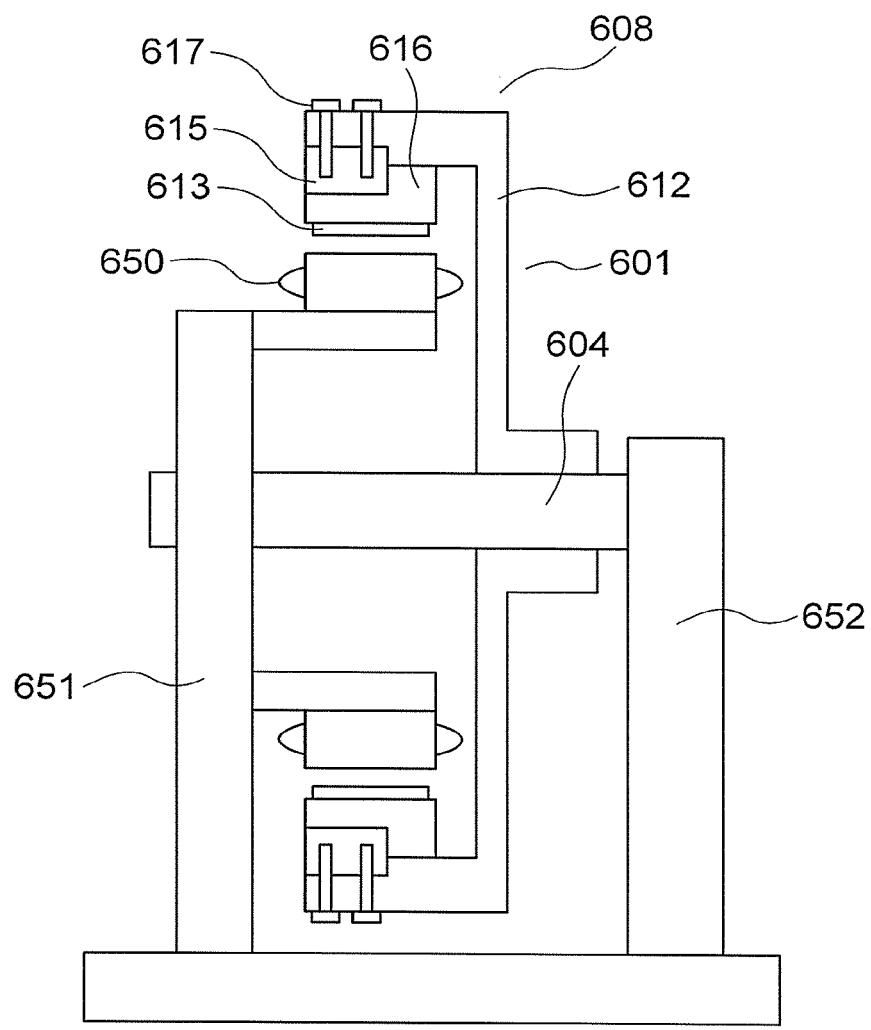
FIG. 27 is a view of an exemplary outer rotor type rotating electric machine in which the rotor according to the first embodiment of the present invention is used.
Figure 28:
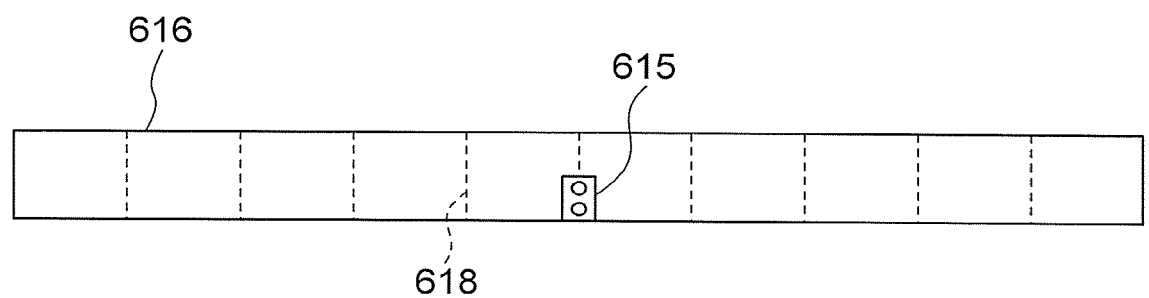
FIG. 28 is a view of a magnet unit for the rotor in FIG. 27.
Figure 29:
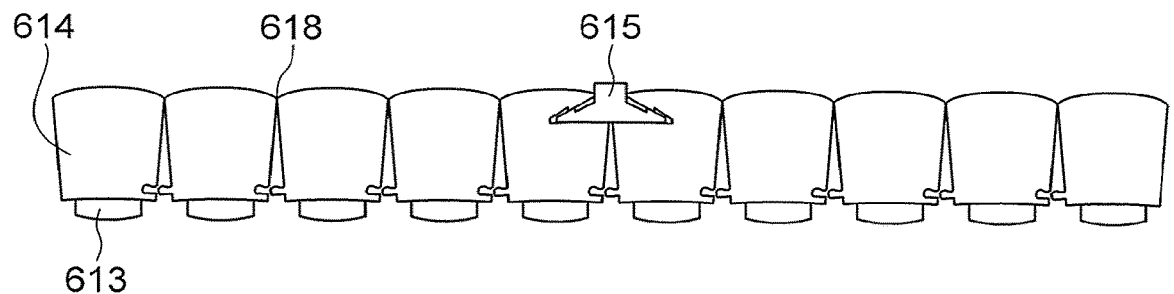
FIG. 29 is a side view of the magnet unit in FIG. 28.
Figure 30:
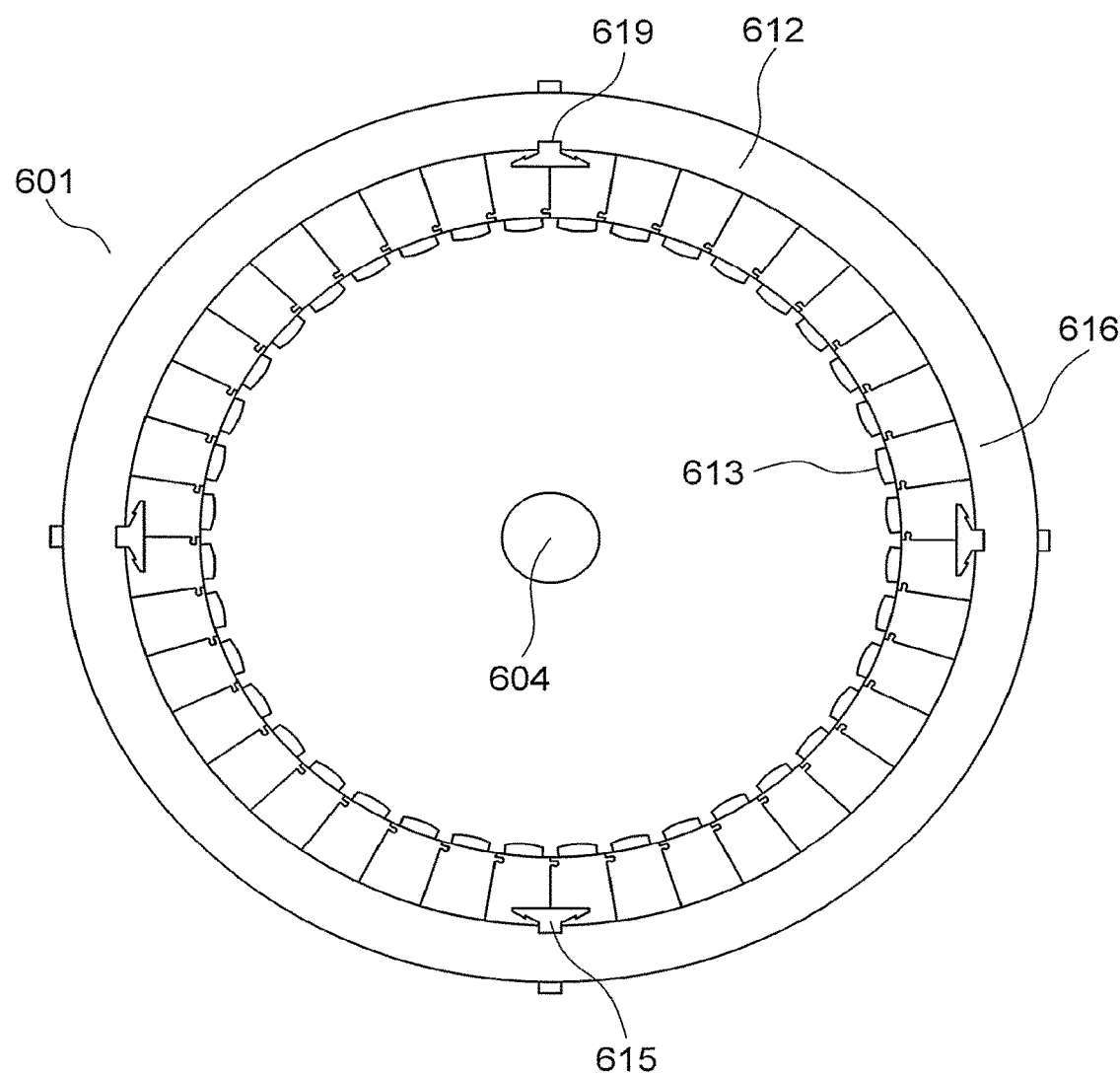
FIG. 30 is a view of the rotor in FIG. 27 as viewed from the support stage side of the stator.

FIG. 27 is a side view of an outer rotor type rotating electric machine 608. FIG. 28 shows a magnet unit 616 spread in a linear arrangement as viewed from the side of a surface for attachment to a rotor main body 612. FIG. 29 is a side view of the magnet unit 616 shown in FIG. 28. FIG. 30 is a view of the rotor 601 in FIG. 27 as viewed in the axial direction from the side of a support stage 651 that supports a stator 650.

Similarly to the first embodiment, the magnet unit 616 includes a plurality of magnet teeth 614 coupled by bridging parts 618. The bridging parts 618 are bent, so that the magnet unit 616 as a whole is arranged in a circular arc shape. The magnet teeth each have a magnet 613 incorporated on the inner circumferential side thereof. The magnet unit 616 has fixation blocks 615 fitted and secured on the inner side. The fixation blocks 615 protrude on the outer circumferential side of the magnet unit 616. The fixation block 615 is fitted in a notch provided at the rotor main body 612 and fastened by bolts 617, and the rotor 601 is thus formed. The rotor 601 is fixed to a rotation shaft 604. The rotor 601 is provided at a very small gap distance in the inner circumferential direction from the stator 650 which is fixed independently from the rotation shaft 604, and a rotating electric machine 608 is thus formed.

More specifically, the magnet unit 616 is connected to the rotor main body 612 in the radial direction of the rotor 601. The magnet unit 616 is provided at a gap distance from the stator 650 in the radial direction of the rotor 601.

Note that in the examples shown in FIGS. 23 to 26 and FIGS. 27 to 30, the adjacent magnet teeth 514 and 614 are coupled by the bridging parts 518 and 618 respectively, while a joint structure may be used for coupling instead of the bridging parts 518 and 618 similarly to the second and third embodiments.

More specifically, the invention may be applied to any of other types of rotating electric machines such as an outer rotor type rotating electric machine and an axial gap type rotating electric machine, and the same advantageous effects as the first to third embodiments of the present invention may be provided.

Figure 31:
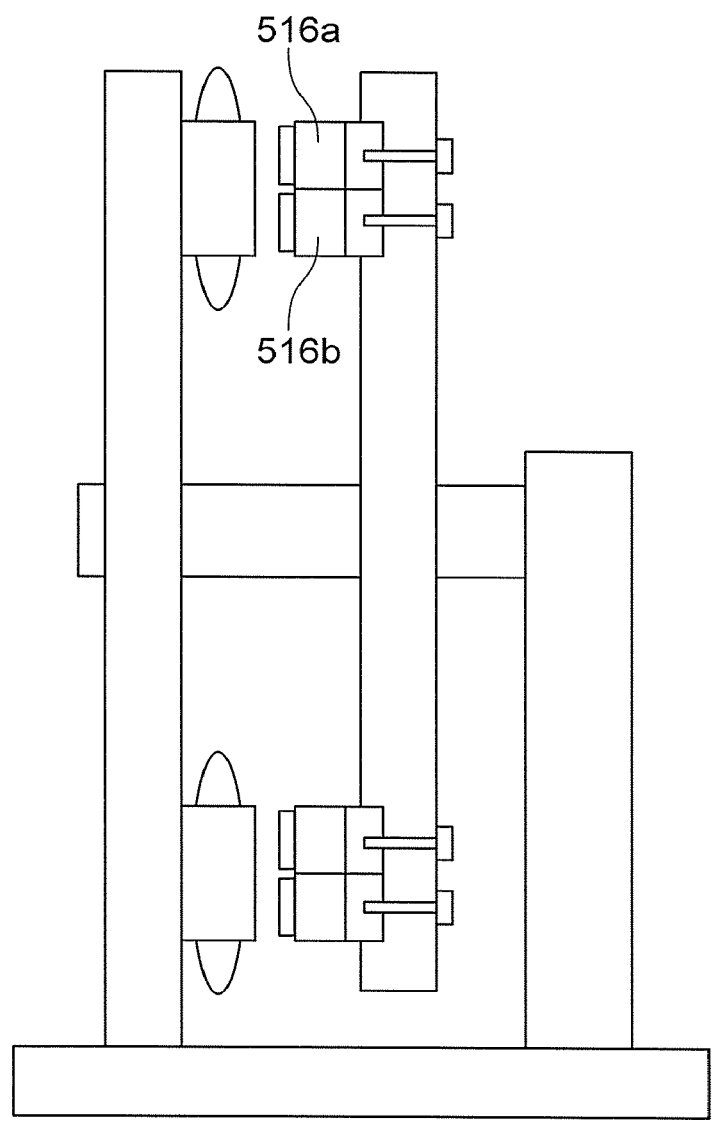
FIG. 31 is a view of magnet units for the rotor in FIG. 23 as segments in the radial direction.
Figure 32:
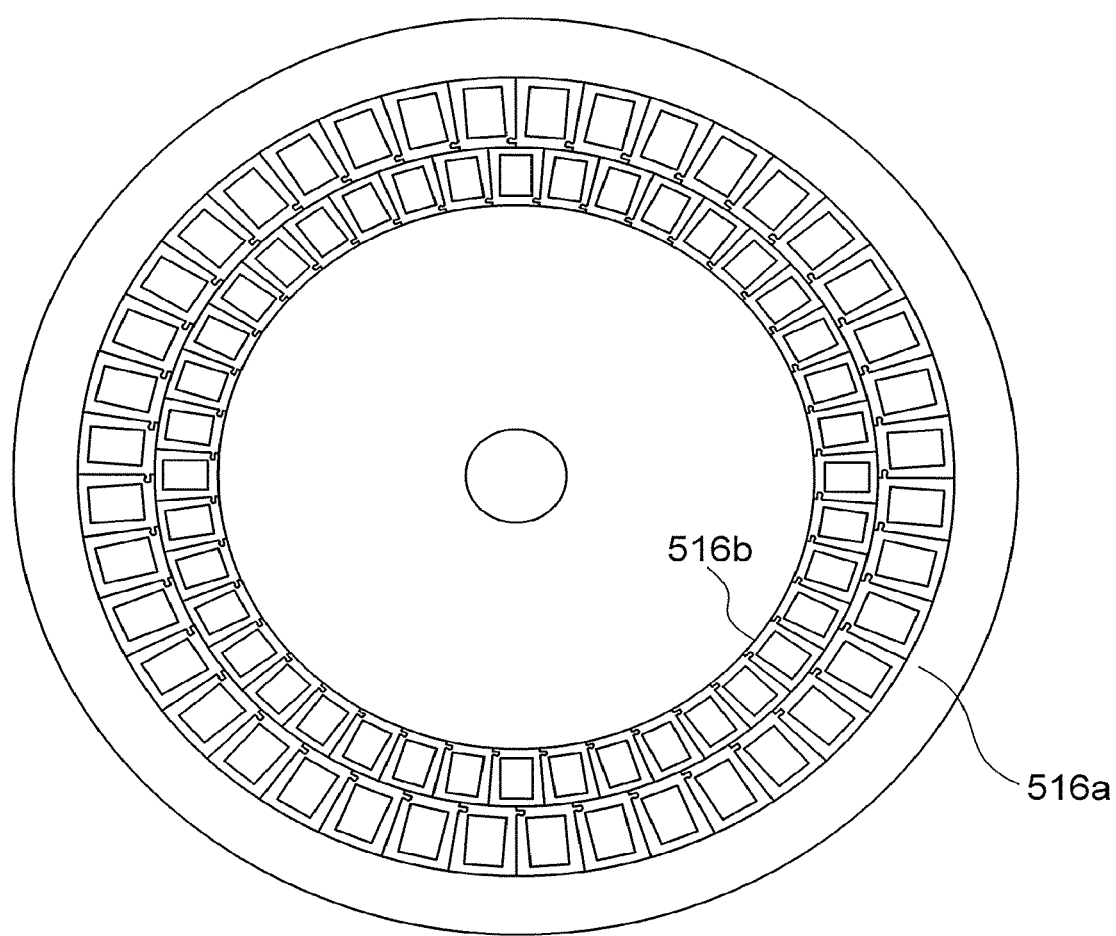
FIG. 32 is a view of the magnet units for the rotor in FIG. 26 as segments in the radial direction.

The magnet unit according to the present invention may be divided into a plurality of parts in the radial direction as shown in FIGS. 31 and 32 for axial gap rotor type rotating electric machine. The plurality of magnet units 516a and 516b obtained by division in the radial direction may be assembled having their phases shifted in the circumferential direction with respect to the rotor main body to form a stepped skew structure.

Figure 33:
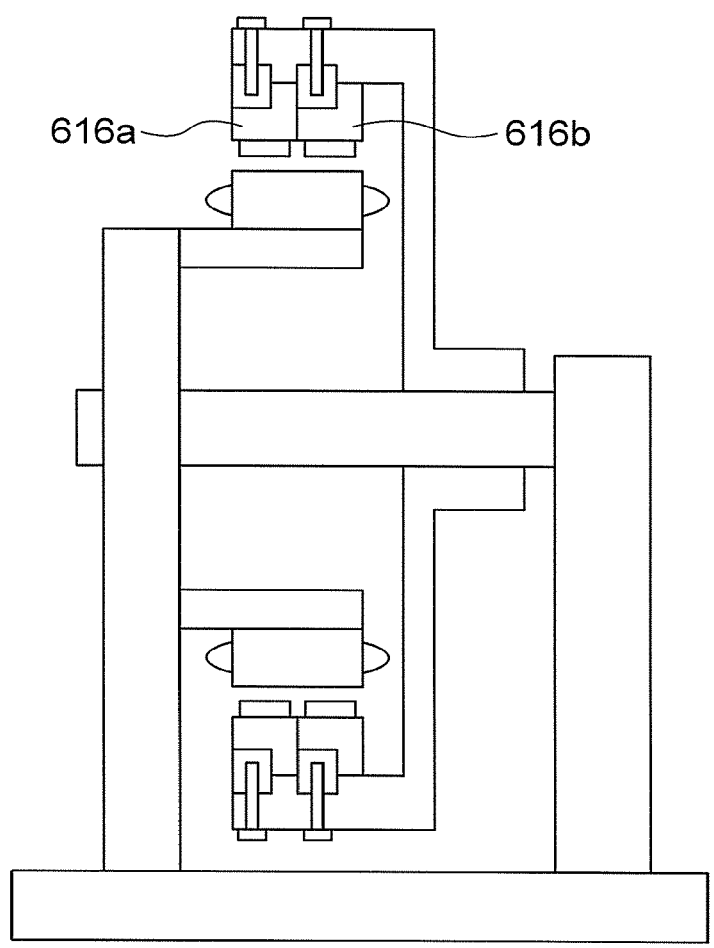
FIG. 33 is a view of the magnet units for the rotor in FIG. 27 as divisional parts in the axial direction.

The magnet unit according to the present invention may be divided into a plurality of parts in the shaft-length direction as shown in FIG. 33 for an inner rotor type or outer rotor type rotating electric machine, and a plurality of magnet units 616a and 616b may be assembled having their phases shifted in the circumferential direction with respect to the rotor main body to form a stepped skew structure.

While the present invention has been described in detail with reference to preferred embodiments, variations and modifications will be apparent to those skilled in the art on the basis of the basic ideas and teachings of the present invention.

The present invention covers a combination of some or all of the features of at least one of the embodiments with another embodiment for the embodiments described above.

REFERENCE SIGNS LIST 5, 550, 650 Stator
11, 101, 501, 601 Rotor
12, 112, 512, 612 Rotor main body
13, 113, 213, 313, 413, 513, 613 Magnet
14, 114, 154, 214, 414, 514, 614 Magnet tooth
15, 115, 515, 615 Fixation block
16, 116, 216, 516, 616 Magnet unit
19a, 19b, 119, 519, 619 Notch

The invention claimed is:

1. A rotating electric machine comprising:
a rotor; and
a stator,
the rotor including a rotor main body and at least one magnet unit provided at an outer circumferential part of the rotor main body,
the at least one magnet unit having a plurality of magnet teeth as segments in a circumferential direction,
the plurality of magnet teeth that form one of the magnet units being arranged in a circular arc shape,
a magnet being attached to each of the plurality of magnet teeth,
at least a pair of the magnet teeth in one of the magnet units being each provided with a notch,
a fixation block being press-fitted in a pair of the notches, with the plurality of magnet teeth being arranged in the circular arc shape,
the fixation block being fastened to the rotor main body, with the fixation block being inserted in the notches,
the magnet teeth including a third type magnet tooth and a fourth type magnet tooth,
the third type magnet tooth having a long hole at a protrusion at an end surface thereof on a first side in the circumferential direction, the long hole being completely surrounded by the third type magnet tooth,
the fourth type magnet tooth having a shaft part at a protrusion at an end surface thereof on a second side in the circumferential direction,
the magnet units being each formed by fitting the long hole of the third type magnet tooth and the shaft part of the fourth type magnet tooth with each other,
the notches having stepped parts,
the fixation block having protrusions, and
when the plurality of magnet teeth are arranged in the circular arc shape, the protrusions of the fixation block are fitted in the stepped parts of the notches.

2. The rotating electric machine of claim 1, wherein the magnet teeth are formed by laminating steel plates.

3. The rotating electric machine of claim 1, wherein the magnet unit is formed by processing a block material.

4. The rotating electric machine of claim 1, wherein the long hole is provided with a raised part that divides a region of the long hole into an expansion position and a reduction position.

5. The rotating electric machine of claim 1, wherein
the rotor is a rotor for an axial gap rotor type rotating electric machine,
the magnet unit is connected to the rotor main body in a shaft-length direction of the rotor, and
the magnet unit is provided at a gap distance from the stator in the shaft-length direction of the rotor.

6. The rotating electric machine of claim 5, wherein the magnet unit is divided into a plurality of parts in a shaft-diameter direction of the rotor main body.

7. The rotating electric machine of claim 6, wherein a plurality of the magnet units arranged in the shaft-diameter direction have different phases in the circumferential direction.

8. The rotating electric machine of claim 1, wherein
the rotor is a rotor for an inner rotor type rotating electric machine or an outer rotor type rotating electric machine,
the magnet unit is connected to the rotor main body in the radial direction of the rotor, and
the magnet unit is provided at a gap distance from the stator in the radial direction of the rotor.

9. The rotating electric machine of claim 8, wherein the magnet unit is divided into a plurality of parts in the shaft-length direction of the rotor main body.

10. The rotating electric machine of claim 9, wherein the plurality of magnet units arranged in the shaft-length direction have different phases in the circumferential direction.

11. The rotating electric machine of claim 1, wherein the shaft part extends in a direction perpendicular to a longest dimension of the long hole.

12. The rotating electric machine of claim 1, wherein the shaft part extends in a direction parallel to an axial direction of the rotor.

13. The rotating electric machine of claim 1, wherein at least a second magnet is attached to each of the plurality of magnet teeth.

14. The rotating electric machine of claim 1, wherein the magnet is attached to an outer circumferential side of each of the plurality of magnet teeth by an adhesive.

15. A rotating electric machine comprising:
a rotor; and
a stator,
the rotor including a rotor main body and at least one magnet unit provided at an outer circumferential part of the rotor main body,
the at least one magnet unit having a plurality of magnet teeth as segments in a circumferential direction,
the plurality of magnet teeth that form one of the magnet units being arranged in a circular arc shape,
a magnet being attached to each of the plurality of magnet teeth,
at least a pair of the magnet teeth in one of the magnet units being each provided with a notch,
a fixation block being press-fitted in a pair of the notches, with the plurality of magnet teeth being arranged in the circular arc shape,
the fixation block being fastened to the rotor main body, with the fixation block being inserted in the notches,
the magnet teeth each having a first hole at an end surface thereof on a first side and a second hole at an end surface thereof on the second side,
a pin being press-fitted in the first hole of each of the magnet teeth and the second hole of an adjacent one of the magnet teeth,
only one of the first hole and the second hole being a long hole while the other being a circular hole.

16. The rotating electric machine of claim 15, wherein the magnet teeth are formed by laminating steel plates.

17. The rotating electric machine of claim 15, wherein the magnet unit is formed by processing a block material.

18. The rotating electric machine of claim 15, wherein the long hole is provided with a raised part that divides a region of the long hole into an expansion position and a reduction position.

19. The rotating electric machine of claim 15, wherein
the rotor is a rotor for an axial gap rotor type rotating electric machine,
the magnet unit is connected to the rotor main body in a shaft-length direction of the rotor, and
the magnet unit is provided at a gap distance from the stator in the shaft-length direction of the rotor.

20. The rotating electric machine of claim 19, wherein the magnet unit is divided into a plurality of parts in a shaft-diameter direction of the rotor main body.

21. The rotating electric machine of claim 20, wherein a plurality of the magnet units arranged in the shaft-diameter direction have different phases in the circumferential direction.

22. The rotating electric machine of claim 15, wherein
the rotor is a rotor for an inner rotor type rotating electric machine or an outer rotor type rotating electric machine,
the magnet unit is connected to the rotor main body in the radial direction of the rotor, and
the magnet unit is provided at a gap distance from the stator in the radial direction of the rotor.

23. The rotating electric machine of claim 22, wherein the magnet unit is divided into a plurality of parts in the shaft-length direction of the rotor main body.

24. The rotating electric machine of claim 23, wherein the plurality of magnet units arranged in the shaft-length direction have different phases in the circumferential direction.

25. The rotating electric machine of claim 15, wherein the first hole and the second hole are each completely surrounded by a corresponding magnet tooth.

* * * * *